US012211155B1

(12) United States Patent
Segal et al.

(10) Patent No.: US 12,211,155 B1
(45) Date of Patent: Jan. 28, 2025

(54) SYSTEM AND METHOD FOR INTERACTIVE VIDEO CONFERENCING

(71) Applicant: Touchcast, Inc., New York, NY (US)

(72) Inventors: Edo Segal, Even Yehuda (IL); Yehor Sydorenko, Zaporozhye (UA)

(73) Assignee: Touchcast, Inc., New York, NY (US)

( * ) Notice: Subject to any disclaimer, the term of this patent is extended or adjusted under 35 U.S.C. 154(b) by 209 days.

(21) Appl. No.: 18/150,581

(22) Filed: Jan. 5, 2023

Related U.S. Application Data

(63) Continuation-in-part of application No. 18/051,728, filed on Nov. 1, 2022, now abandoned, which is a continuation of application No. 16/820,573, filed on Mar. 16, 2020, now Pat. No. 11,488,363.

(60) Provisional application No. 63/296,832, filed on Jan. 5, 2022, provisional application No. 63/296,693, filed on Jan. 5, 2022, provisional application No. 62/858,143, filed on Jun. 6, 2019, provisional application No. 62/833,396, filed on Apr. 12, 2019, provisional application No. 62/832,751, filed on Apr. 11, 2019, provisional application No. 62/819,501, filed on Mar. 15, 2019.

(51) Int. Cl.
*G06T 19/00* (2011.01)
*G06N 20/00* (2019.01)
*H04N 7/14* (2006.01)

(52) U.S. Cl.
CPC ........... *G06T 19/006* (2013.01); *G06N 20/00* (2019.01); *H04N 7/142* (2013.01); *H04N 7/147* (2013.01); *H04N 2007/145* (2013.01)

(58) Field of Classification Search
None
See application file for complete search history.

(56) References Cited

U.S. PATENT DOCUMENTS

| 6,020,931 A | 2/2000 | Bilbrey et al. |
| 7,216,092 B1 | 5/2007 | Weber et al. |
| 7,577,978 B1 | 8/2009 | Wistendahl et al. |
| 7,833,640 B2 * | 11/2010 | Marinero ............... G11B 5/737 428/829 |
| 8,508,614 B2 | 8/2013 | Segal |
| 8,584,164 B2 | 11/2013 | Walter et al. |
| 8,745,657 B2 | 6/2014 | Chalozin et al. |
| 9,036,043 B2 | 5/2015 | Segal |
| 9,363,448 B2 | 6/2016 | Segal |
| 9,661,256 B2 | 5/2017 | Segal |

(Continued)

FOREIGN PATENT DOCUMENTS

| GB | 2502986 | 12/2013 |
| WO | 2010141939 A1 | 12/2010 |

(Continued)

*Primary Examiner* — Tapas Mazumder
(74) *Attorney, Agent, or Firm* — Leason Ellis LLP

(57) ABSTRACT

Systems and methods for facilitating, managing, and providing on-line events and meetings. The present disclosure provides systems and methods for creation of content, live video event manages content and information to be provided during online events and meetings, as well as for generating and managing archives thereof. The present disclosure provides a set of tools for creating a virtual environment that includes a mixed-reality world of virtual sets and live video streams that enables users to attend large scale events and stay engaged in virtual conferences that can last days or longer.

12 Claims, 39 Drawing Sheets

(56) References Cited

U.S. PATENT DOCUMENTS

| | | |
|---|---|---|
| 9,787,945 B2 | 10/2017 | Segal |
| 9,852,764 B2 | 12/2017 | Segal |
| 10,033,967 B2 | 7/2018 | Segal |
| 10,075,676 B2 | 9/2018 | Segal |
| 10,523,899 B2 | 12/2019 | Segal |
| 11,488,363 B2 | 11/2022 | Segal |
| 2001/0006382 A1 | 7/2001 | Sevat |
| 2002/0186233 A1 | 12/2002 | Holtz et al. |
| 2004/0015398 A1 | 1/2004 | Hayward |
| 2005/0137958 A1 | 6/2005 | Huber et al. |
| 2005/0204438 A1 | 9/2005 | Wang |
| 2006/0075668 A1 | 4/2006 | Sauer |
| 2006/0090141 A1 | 4/2006 | Loui et al. |
| 2007/0266322 A1 | 11/2007 | Tretter et al. |
| 2008/0033806 A1 | 2/2008 | Howe |
| 2008/0096175 A1 | 4/2008 | Du Toit Ilne et al. |
| 2008/0109300 A1 | 5/2008 | Bason |
| 2008/0120675 A1 | 5/2008 | Morad et al. |
| 2008/0150913 A1 | 6/2008 | Bell et al. |
| 2009/0066690 A1 | 3/2009 | Harrison |
| 2009/0153804 A1 | 6/2009 | Giraldo et al. |
| 2009/0237565 A1 | 9/2009 | Staker et al. |
| 2009/0327418 A1 | 12/2009 | Zhang et al. |
| 2010/0083191 A1 | 4/2010 | Marshall |
| 2010/0174783 A1 | 7/2010 | Zarom |
| 2011/0052144 A1 | 3/2011 | Abbas et al. |
| 2011/0161990 A1 | 6/2011 | Smith |
| 2011/0202827 A1 | 8/2011 | Freishtat |
| 2011/0249075 A1 | 10/2011 | Abuan et al. |
| 2011/0254912 A1 | 10/2011 | Mock et al. |
| 2011/0298935 A1 | 12/2011 | Segal |
| 2012/0158524 A1 | 6/2012 | Hintz |
| 2013/0031593 A1 | 1/2013 | Booth |
| 2013/0073985 A1 | 3/2013 | Hamlin et al. |
| 2013/0117129 A1 | 5/2013 | Brown et al. |
| 2013/0155187 A1 | 6/2013 | Skyberg |
| 2013/0173355 A1 | 7/2013 | Barcenas |
| 2013/0212615 A1 | 8/2013 | Shultz |
| 2014/0002581 A1 | 1/2014 | Bear et al. |
| 2014/0086557 A1 | 3/2014 | Yu et al. |
| 2014/0132702 A1 | 5/2014 | Leibovich et al. |
| 2014/0215542 A1 | 7/2014 | Terpe |
| 2014/0282220 A1 | 9/2014 | Wantland |
| 2014/0310287 A1* | 10/2014 | Bruso ................ G06F 16/2272 707/741 |
| 2014/0321834 A1* | 10/2014 | Segal .................... H04N 5/265 386/282 |
| 2015/0149930 A1 | 5/2015 | Walkin et al. |
| 2016/0080835 A1 | 3/2016 | von Sneidern et al. |
| 2016/0098941 A1 | 4/2016 | Kerluke |
| 2016/0373693 A1 | 12/2016 | Segal et al. |
| 2018/0150985 A1 | 5/2018 | McDonald |
| 2018/0276841 A1 | 9/2018 | Krishnaswamy |
| 2019/0295321 A1 | 9/2019 | Neser |
| 2023/0123620 A1* | 4/2023 | Simpson ............... G06F 3/0482 701/410 |
| 2023/0206569 A1 | 6/2023 | Segal |

FOREIGN PATENT DOCUMENTS

| | | |
|---|---|---|
| WO | 2012139082 A1 | 10/2012 |
| WO | 2013076478 | 5/2013 |
| WO | 2013167901 | 11/2013 |

\* cited by examiner

SYSTEM AND METHOD FOR INTERACTIVE VIDEO CONFERENCING

CROSS-REFERENCE TO RELATED APPLICATIONS

This application is based on and claims to priority U.S. Provisional Patent Application No. 63/296,832 filed on Jan. 5, 2022; further, this application is based on and claims priority to U.S. Provisional Patent Application No. 63/296,693 filed on Jan. 5, 2022; further this application is based on and claims priority to U.S. patent application Ser. No. 18/051,728 filed on Nov. 1, 2022, in which U.S. patent application Ser. No. 18/051,728 is based on and claims priority to U.S. patent application Ser. No. 16/820,573 filed on Mar. 16, 2020 (now U.S. Pat. No. 11,488,363, issued on Nov. 1, 2022), in which U.S. patent application Ser. No. 16/820,573 claims priority to i) U.S. Provisional Patent Application No. 62/819,501 filed on Mar. 15, 2019, ii) U.S. Provisional Patent Application No. 62/832,751 filed on Apr. 11, 2019, iii) U.S. Provisional Patent Application No. 62/833,396 filed on Apr. 12, 2019, and iv) U.S. Provisional Patent Application No. 62/858,143 filed on Jun. 6, 2019, each of which is incorporated by reference in its respective entirety herein, as if expressly set forth herein.

FIELD

The present disclosure relates, generally, to content presentation and, more particularly, to a system and method for providing and interacting with content via interactive communication sessions.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

One of the biggest missed opportunities of the entire category of smart TV connected devices is the absence of easy to deploy video conferencing. As millions of consumers place these devices in their living rooms the core use case of facilitating communications via the large screen TV is missing.

It is with respect to these and other considerations that the disclosure made herein is presented.

BRIEF SUMMARY

In one or more implementations, a computer-implemented virtual event management platform and method can be provided, including non-transitory processor readable media and at least one processor operatively coupled to the non-transitory processor readable media. The non-transitory processor readable media can have instructions that, when executed by the at least one processor, causes the at least one processor to perform various processing steps. The steps can include defining, for each of at least one date, a plurality of tracks, wherein each track comprises a plurality of respective virtual sessions. Further the at least one processor can be configured to provide, to each of a plurality of computing devices, a graphical user interface that includes selectable options for each of the plurality of computing devices to select one or more tracks and one or more virtual sessions. Moreover, the at least one processor can be configured to define respective networked communication sessions, wherein the respective networked communication sessions are usable by each of the plurality of computing devices to join the one or more virtual sessions. Still further, the at least one computing device is configured to receive, via the graphical user interface, responses to the selectable options, wherein each respective response enables access to at least one of the one or more virtual sessions. Some of the plurality of user computing devices can be operated by users who are featured during a respective virtual session, and some of the plurality of user computing devices can be operated by users who are not featured during a respective virtual session. Moreover, the at least one processor can be configured to define access rights for respective ones of the plurality of computing devices operated by users who are not featured during a respective virtual session to communicate via a chat session during a respective virtual session.

In one or more implementations, the at least one processor can be further configured to receive, from each of the respective computing devices operated by users who are scheduled to attend a respective virtual session, contact information. Moreover, the at least one processor can be configured to provide, as a function of the contact information, selectable options for the users who are scheduled to attend the respective virtual session to be introduced and communicate.

In one or more implementations, the at least one processor can be further configured to manage meeting information representing each of a plurality of meetings for users who are scheduled to attend a respective virtual session to attend scheduled to attend a respective session receive, from at least one of the users. Moreover, the at least one processor can be configured to provide, for each of the plurality of computing devices operated by users attending a respective session, at least some of the meeting information in selectable options.

In one or more implementations, the meeting information includes at least a date and time for a meeting, a meeting identification, a passcode for joining the meeting, and a hyperlink that, when selected, provides access to the meeting.

In one or more implementations, the at least one processor can be further configured to provide, a virtual meeting setting for users who join the meeting.

In one or more implementations, the at least one processor can be further configured to generate and provide analytics associated with each of the respective virtual sessions.

Other features and advantages of the present disclosure will become apparent from the following description of the invention that refers to the accompanying drawings.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIG. 7 illustrates example resources that are made available to participants, including by download or link, in accordance with an example implementation of the present disclosure;

FIG. 16 illustrates an example graphical user interface display screen for a user who selects an option for the white listed emails module, in accordance with an example implementation;

DETAILED DESCRIPTION

Figure 1:
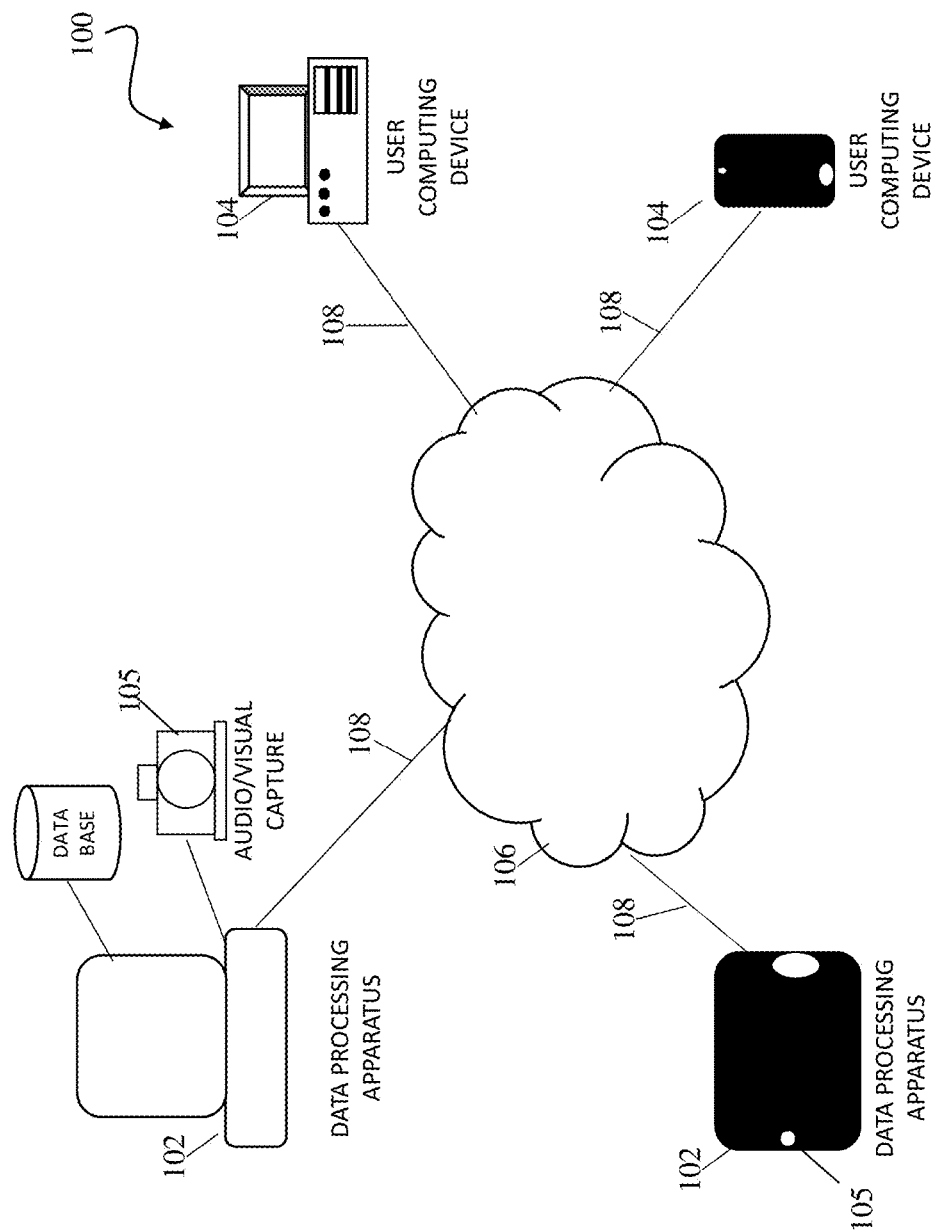
FIG. 1 is a diagram illustrating an example hardware arrangement that operates for providing the systems and methods disclosed herein.

By way of overview and introduction, the present disclosure provides systems and methods for facilitating, managing, and providing on-line events and meetings. The present disclosure provides systems and methods for creation of content, live video event manages content and information to be provided during online events and meetings, as well as for generating and managing archives thereof. The present disclosure provides a set of tools for creating a virtual environment that includes a mixed-reality world of virtual sets and live video streams that enables users to attend large scale events and stay engaged in virtual conferences that can last days or longer.

More particularly, the present disclosure provides virtual events as structured, organized gatherings that take place entirely via a digital platform, as opposed to or in addition to in-person. The virtual events provided in accordance with the present disclosure can range in size, and may be small online meetings or virtual conferences with thousands of attendees worldwide. Further, virtual events provided in accordance with the present disclosure can vary in format. For example, virtual events can be single webinars with one presenter or can be multi-day virtual conventions with numerous tracks and concurrent virtual speakers.

In one or more implementations, attendees join a virtual event within a digital platform. They can do this, for example, from their own individual physical locations using some form of video conferencing software. Virtual events typically occur in real-time, but have the option of being recorded. This allows them to be accessible to attendees for extended periods of time after the initial transmission.

In one or more implementations, speakers at on-line conferences and events appear transported into virtual sets, such as a stage within an auditorium or theater, thereby providing an immersive user experience for attendees. The tools of the present disclosure provide an intersection of mixed reality and artificial intelligence, thereby creating an illusion of a large-scale production in which users connect remotely, such as from their respective home offices. Participants of a virtual, on-line conference experience speakers in attractive, virtual spaces that look and feel real.

The present disclosure includes production tools for creating and utilizing events of comprised of mixed reality venues, including by processing live video feed received from one or more sources to provide a multi-media experience that appears as a multi-camera production, regardless of where the host or attendees are located. Information associated with on-line events including, for example, content provided during an event, information associated with presenters, information associated with speakers, and information associated with attendees, and technology respectively used thereby, can be received via one or more user interfaces, data import operations or other suitable technology. Further, users can configure options associated with the present disclosure to manage information associated with event schedules (at least partially referred to herein, generally, as "tracks"), agendas, and various kinds of event settings. Moreover, interpersonal communications can be managed, such as by providing registrants with access of to interface in chat rooms or to communicate in various ways during a respective session, and/or over the course of a multiple-day event.

Events that are provided in connection with the present disclosure can occur over a short period of time, such as minutes or over hours, or can occur over a longer period, such as over the course of days or weeks. Events can include various forms of interaction live video content and prerecorded content presented in an unlimited number of virtual spaces and locations, such as theaters, museums, malls, classrooms, lecture halls, outdoor parks and nature preserves, homes, or virtually any other suitable location.

In addition, discussions that take place during events, including presentations, talks, meetings, chats, or other interactivity, can be transcribed automatically into electronic text. In one or more implementations, systems and methods disclosed herein are implemented as a function of one or more artificial intelligent agents. The agents provided with the present disclosure can be configured to interface with a plurality of computer-based (e.g., software) agents that operate in disparate computing environments. Such interaction enhances meeting sessions, and representations of meetings can be enhanced as a function of content that is retrieved from a multitude of sources and provided via one or more of the agents. For example, the content can be retrieved in response to request(s) from a user or can be retrieved independently and proactively, such as via real-time analysis of user discussions and other activity that is "observed" during the meeting.

Thus, in one or more implementations, a packaged multimedia file, such as interactive video shown and described herein, is processed using voice recognition, optical character recognition or other processing occurs, including substantially in real-time, to generate analytics for additional functionality. Analytics associated with user activity can be provided, such as relating to where, when, and how users interact with content and each other.

In accordance with the teachings herein, implementations of the present disclosure provide a simple to use, informing and entertaining communications experience that incorporates content from a plurality of computing devices, e.g., smartphones, tablets, laptops and desktops, and enables live sharing in a real-time and conferencing capability therefor. In one or more implementations, one or more televisions can be used for respective audio/visual display devices, and can provide feed from cameras and/or microphones configured with various local and/or remotely located computing devices that are communicating over data communication networks such as the Internet. A television can be implemented in the present disclosure in various ways, such as via an Internet media extender provided by APPLE TV, ROKU, AMAZON FIRE TV or GOOGLE CHROMECAST. As used herein, an Internet media extender refers, generally, to a category of devices that provide for content to be streamed to a television, surround sound devices, and the like. Unlike functionality provided by known Internet media extenders, however, the present disclosure facilitates integrating audio/video input capabilities of computing devices (e.g., microphones, cameras and software that drive and enhance audio/visual captures) into video-conferencing capabilities. The present disclosure facilitates one or more of: one-to-one (1:1) video conferencing; group video conferencing; sharing and/or viewing of content provided on a plurality of computing devices, and interactive computing activities.

The present disclosure improves live and online meetings, including by determining whether scheduled attendees are present and accounted for, and whether attendees are complying with a predetermined agenda during a meeting. Moreover, action items that are discussed during the meeting can be collected as a function of one or agent-based operations, and the action items can be assigned to one or more of the attendees, for example, during the meeting or shortly thereafter.

The present disclosure can also be configured with technology to provide post-meeting summaries to attendees and other individuals as a function of recorded meeting discussions and/or analyzed content discussed during a meeting. The summaries can be configured in various ways, including in "smart" notes that include interactivity. In one or more implementations, the smart notes are configured as interactive video, such as shown and described in U.S. patent application Ser. No. 15/247,534, entitled SYSTEM AND METHOD FOR INTERACTIVE VIDEO CONFERENCING and filed Aug. 25, 2016, and U.S. patent application Ser. No. 14/316,536, entitled SYSTEM AND METHOD FOR PROVIDING AND INTERACTING WITH COORDINATED PRESENTATIONS and filed Jun. 26, 2014, which are incorporated by reference herein.

Post-meeting summaries that are generated in accordance with the present disclosure can be particularly useful to allow attendees to participate during meetings without being distracted by a need to take detailed written notes. Additionally, due to the retrievable and interactive nature of meeting summaries generated in accordance with the present disclosure, attendees can be provided with a valuable resource that enables improved participation in subsequent meetings. For example, prior to the start of a meeting or during a meeting, summaries of previous meetings can be generated, compiled and/or provided as a function of the present disclosure, and can be provided to participants, such as on-demand or substantially automatically.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present disclosure, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools, to provide received data on audio/visual devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present disclosure provides improved processing techniques to prevent packet loss, to improve handling interruptions in communications, and other issues associated with wireless technology.

According to an embodiment of the present disclosure, user computing device 104 provides user access to data processing apparatus 102 for the purpose of receiving and providing information. Examples and description of specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
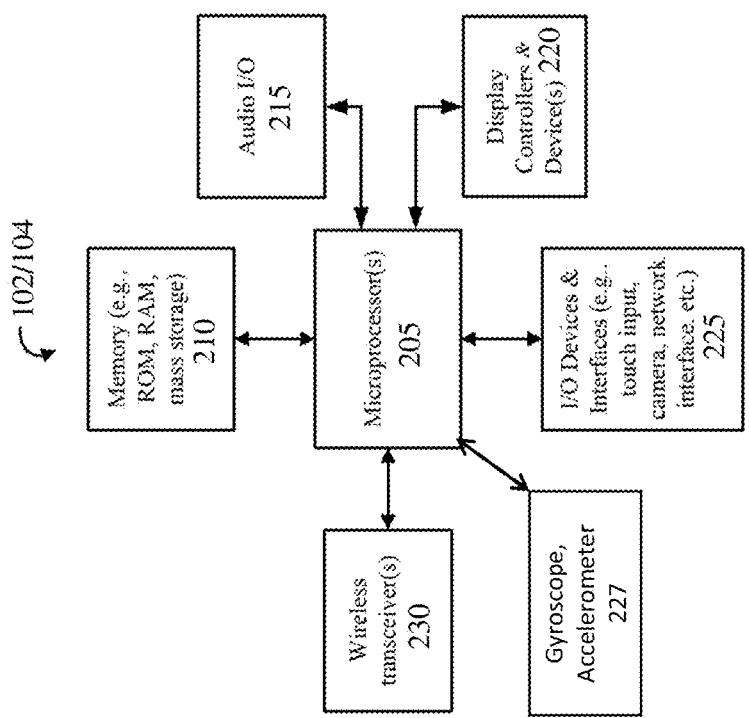
FIG. 2 is a block diagram that illustrates functional elements of a computing device in accordance with an implementation of the present disclosure.

FIG. 2 illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type of memory.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G, 5G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present disclosure provides improved processing techniques to prevent packet loss, to improve handling interruptions in communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present disclosure, at least in part, for establishing and controlling media sessions between various end points, including user computing devise 104, Internet media extender 110 and data processing apparatus 102.

In addition to RTSP, one or more implementations of the present disclosure can be configured to use Web Real-Time Communication ("WebRTC") to support browser-to-browser applications, including in connection with voice, video chat, and peer-to-peer ("P2P") file sharing. Thus, the present disclosure avoids a need for either internal or external plugins to connect endpoints, including for voice/video or other communication sharing. In one or more implementations, the present disclosure implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

In one or more implementations, each of a plurality of participants operating, for example, user computing device 104 participate in an interactive video conference at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera and/or microphone.

Thus, in one or more implementations, the present disclosure can implement a star topology in which a central node (e.g., a data processing apparatus 102) receives low resolution of video content from each of a plurality of computing devices (e.g., client devices 104). The central node can be configured by executing program instructions to compose a single video comprising all of the video received from the various devices. The single video can be provided substantially in real-time as one high-definition ("HD") video. The central node can send the HD video to all of the computing devices operated by the various users, as well as to the device operated by the "presenter."

Continuing with the respective one or more implementations described above, each of the respective individual feeds from the respective devices is received by the data processing apparatus 102 and the video feeds (including, for example, images) are composed into a single video stream. The video stream can be configured as a high definition stream (e.g., 1280×720 or higher resolution), and output to each of at least some of the respective user computing devices 104.

Figure 3:
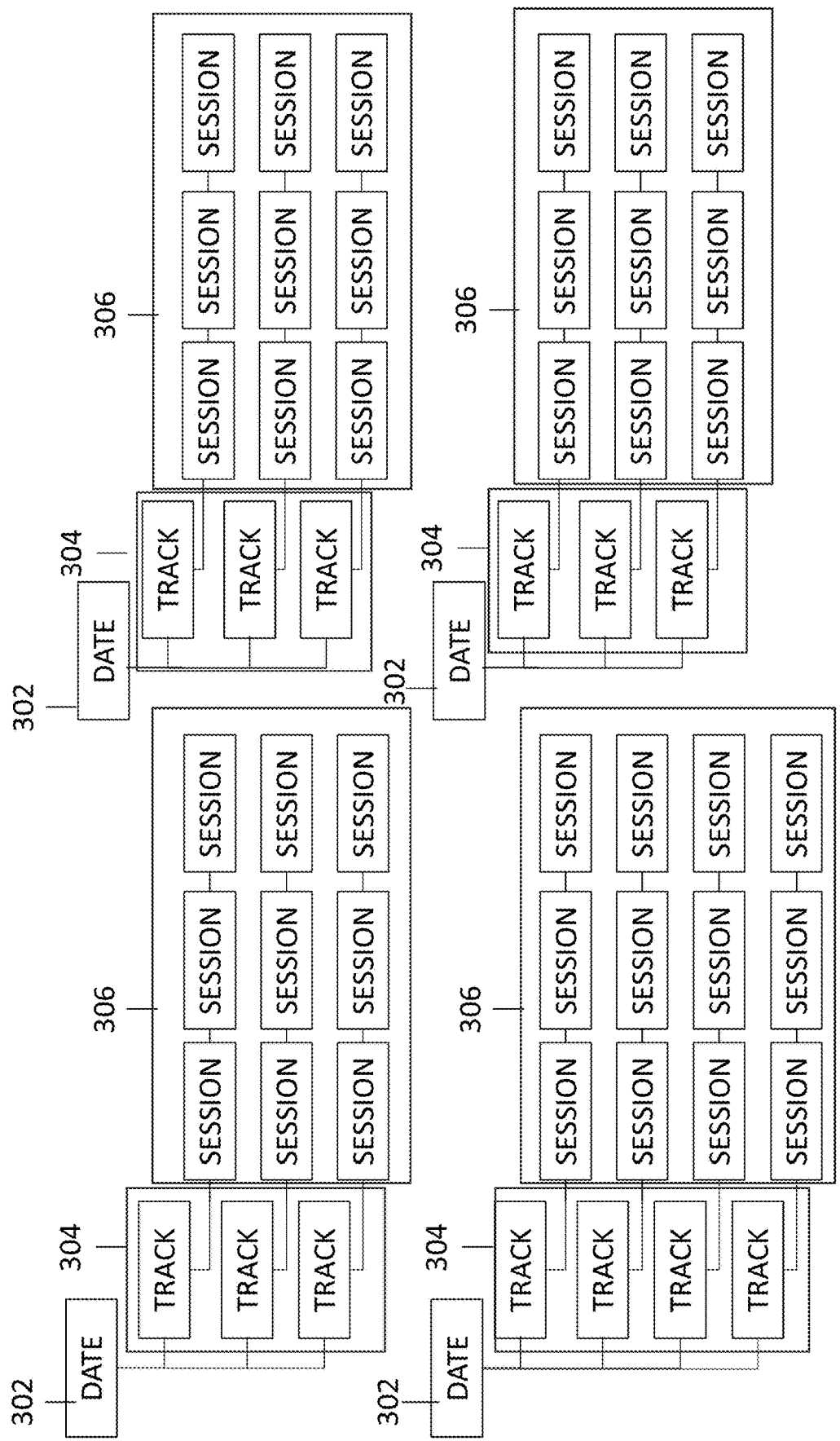
FIG. 3 is a block diagram illustrating an example event schedule that includes multiple dates, tracks, and sessions.

FIG. 3 is a block diagram illustrating an example event schedule that includes multiple events 302, tracks 304, and sessions 306. For each respective date, a plurality of tracks are provided representing options for participants, e.g., registrants, to select which correspond with respective sessions. Features and descriptions associated with events 302, tracks 304, and sessions 306 are provided herein.

Figure 4A:
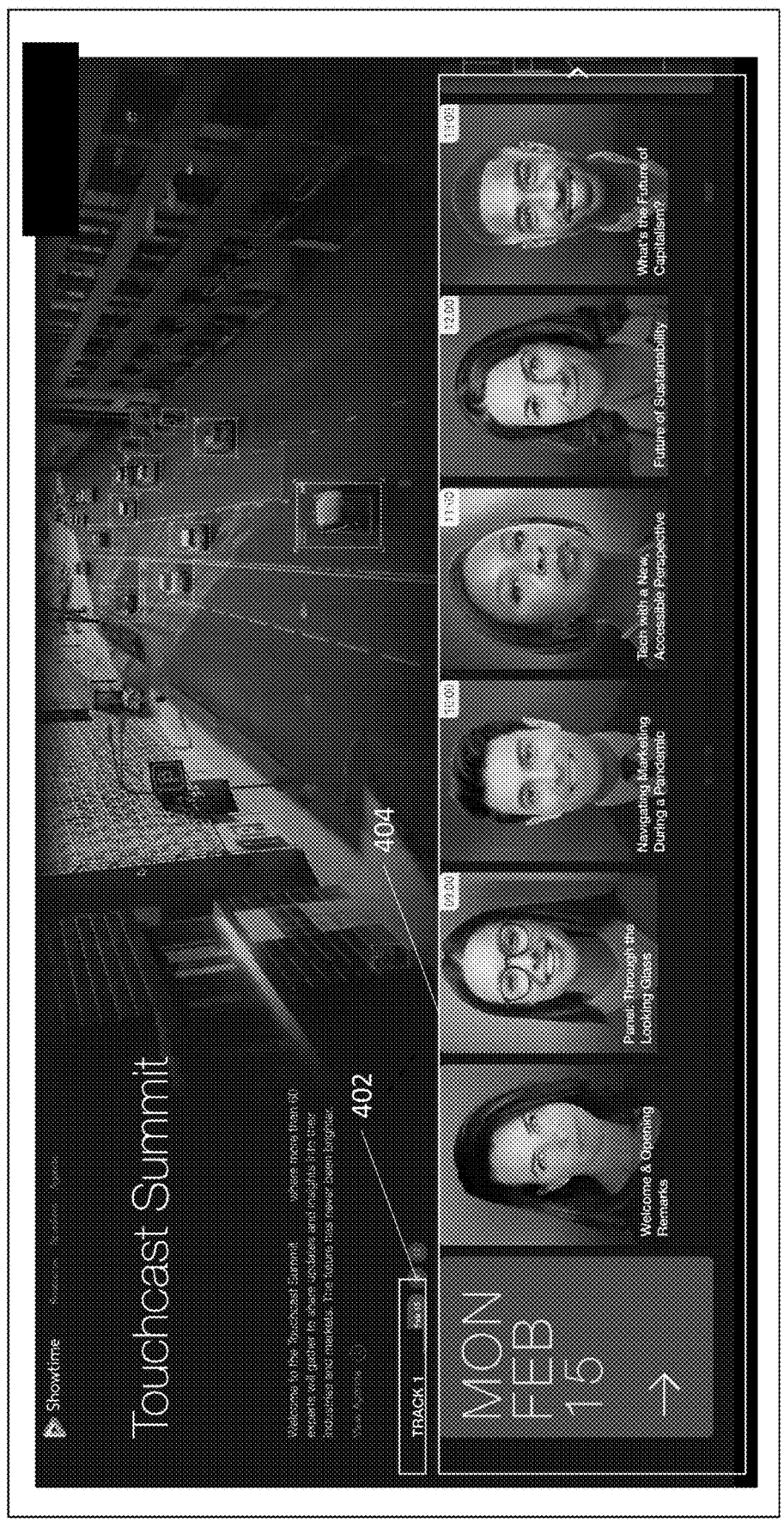
FIGS. 4A and 4B are example display screens in accordance with an example user interface provided in accordance with the present disclosure.
Figure 4B:
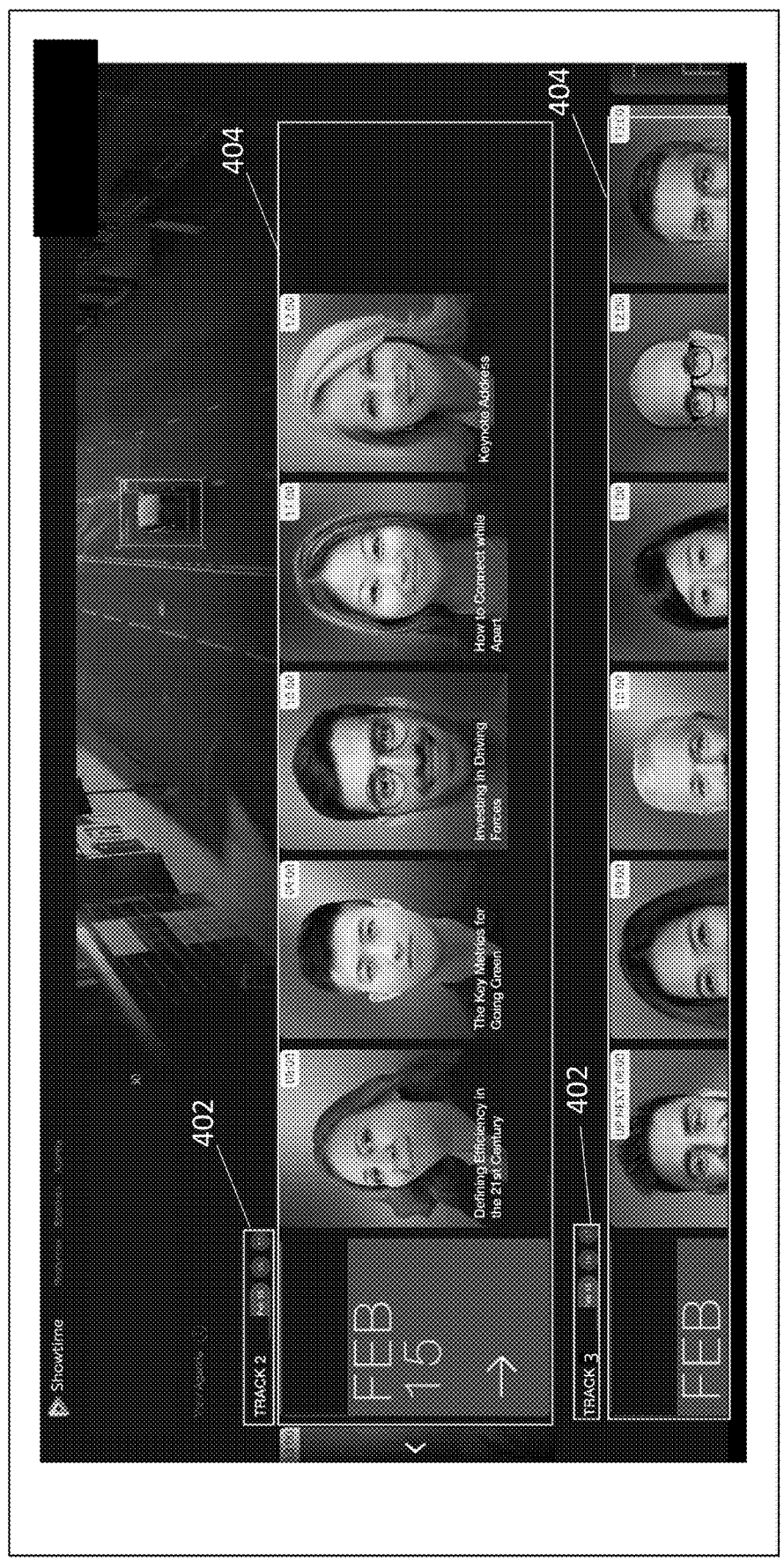
Figure 5:
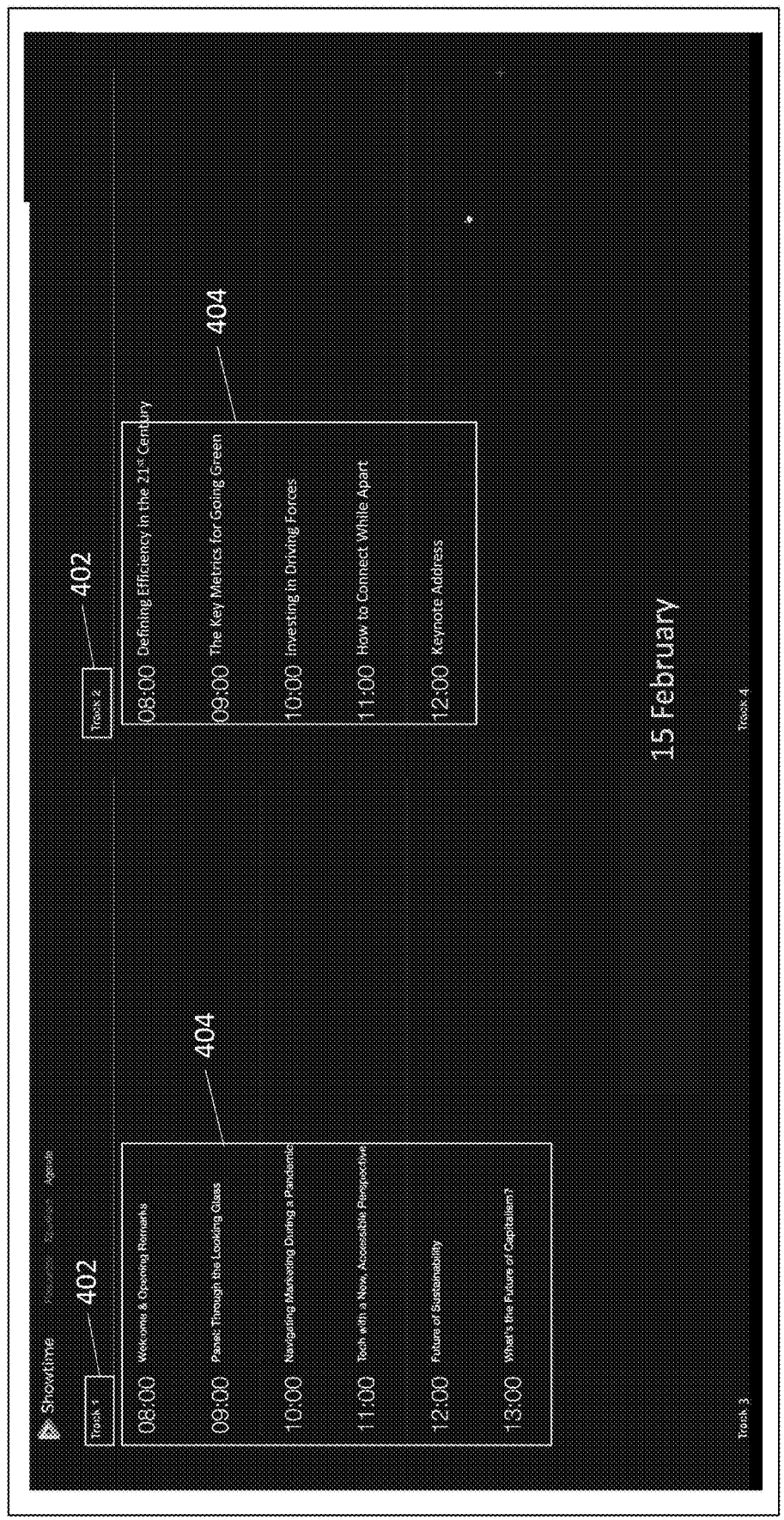
FIG. 5 is an alternate view of available sessions along the track 1 and track 2 options illustrated in FIGS. 4A and 4B.

FIGS. 4A and 4B are example display screens in accordance with an example user interface provided in accordance with the present disclosure. In the example shown in FIG. 4A, an event entitled Touchcast Summit is shown, with respective sessions throughout a first day (February 15) in connection with track one selection. FIG. 4B illustrates example sessions throughout the same first day but for track 2 and track 3 (which appears partially cut off). FIG. 5 is an alternate view of available sessions along the track 1 and track 2 options illustrated in FIGS. 4A and 4B, for the first day of the event (February 15). The views set forth in FIGS. 4A, 4B, and 5 can be configured with selectable options, such as hyperlinks, to provide additional functionality for participants. For example, a participant can select a respective session in a given track 304 and reserve access to the respective session.

Figure 6A:
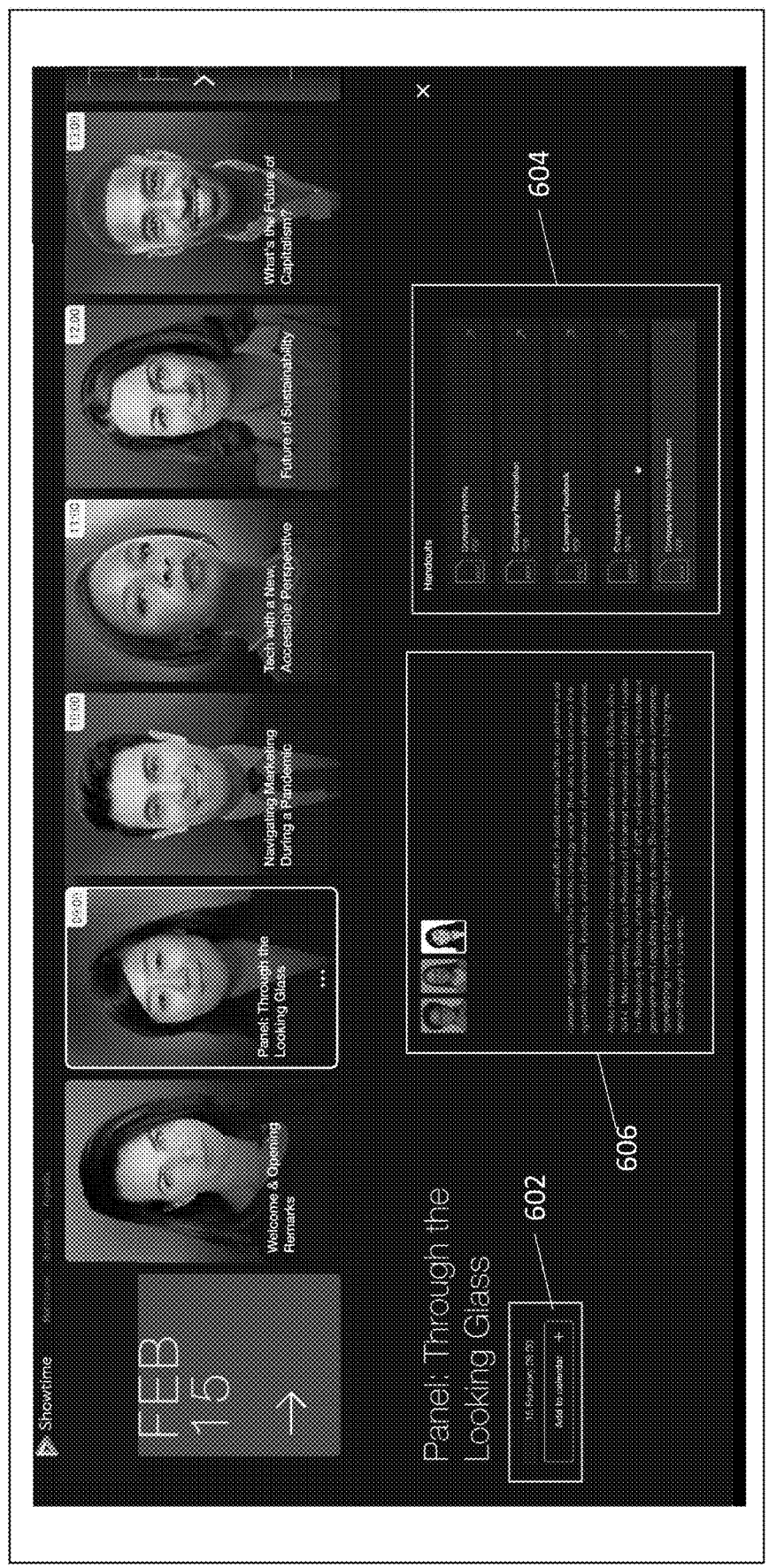
FIGS. 6A and 6B are example display screens in accordance with an example user interface provided in accordance with the present disclosure.
Figure 6B:

FIGS. 6A and 6B are example display screens in accordance with an example user interface provided in accordance with the present disclosure. In the example shown in FIGS. 6A and 6B, a respective presenter is highlighted, for example, by a user selecting the image of the presenter and the interface using his or her mouse or other pointing device. Upon selecting a respective presenter, additional information is provided automatically, including a biography of the respective presenter and options for selecting the respective session for entry in a calendar. Moreover, various materials can be provided upon selection of a respective session, such as handouts to accompany a session. Handouts can include profiles, presentation materials, feedback, or other content in various electronic formats, such as PDF, MP4, XLS, or other format. Further, various calendar functionality, such as shown in FIG. 6B, can be provided and include an option to download a calendar data file (e.g., an ".ICS" file), as well as to add an automatic calendar entry in various proprietary calendar formats, such as Google calendar, Apple calendar, Outlook or Yahoo.

Figure 7:
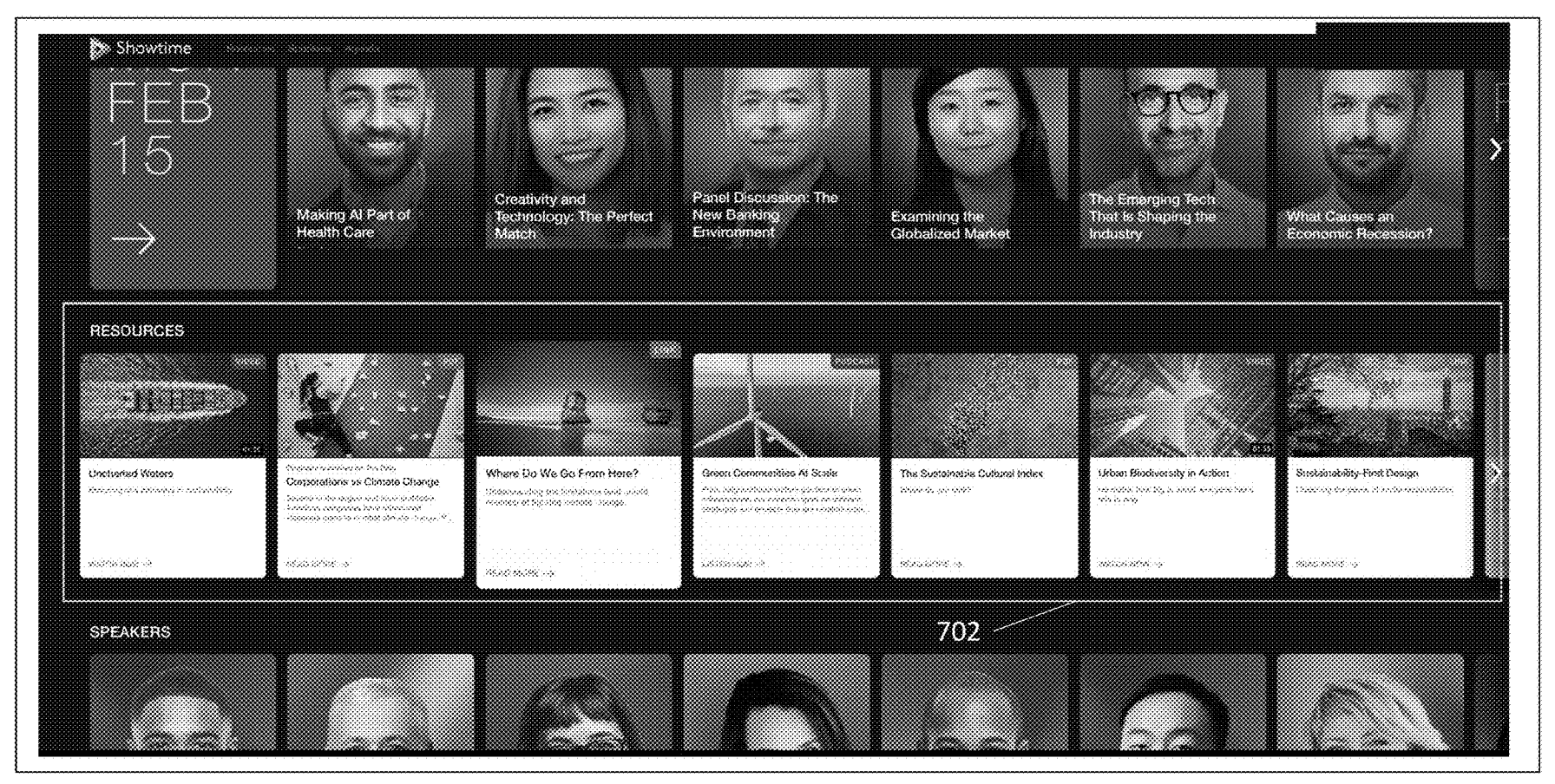

In addition to presentation materials that can be provided, such as shown and described in FIG. 6B, various online or electronic resources can be provided to participants, particularly materials that are relevant to or accompany one or more sessions during a selected track 304. For example, resources can include videos, links, podcasts, documents or other materials or resources and materials can be provided via a hyperlink for participants to access. FIG. 7 illustrates example resources that are made available to participants, including by download or link, in accordance with an example implementation of the present disclosure.

Figure 8:
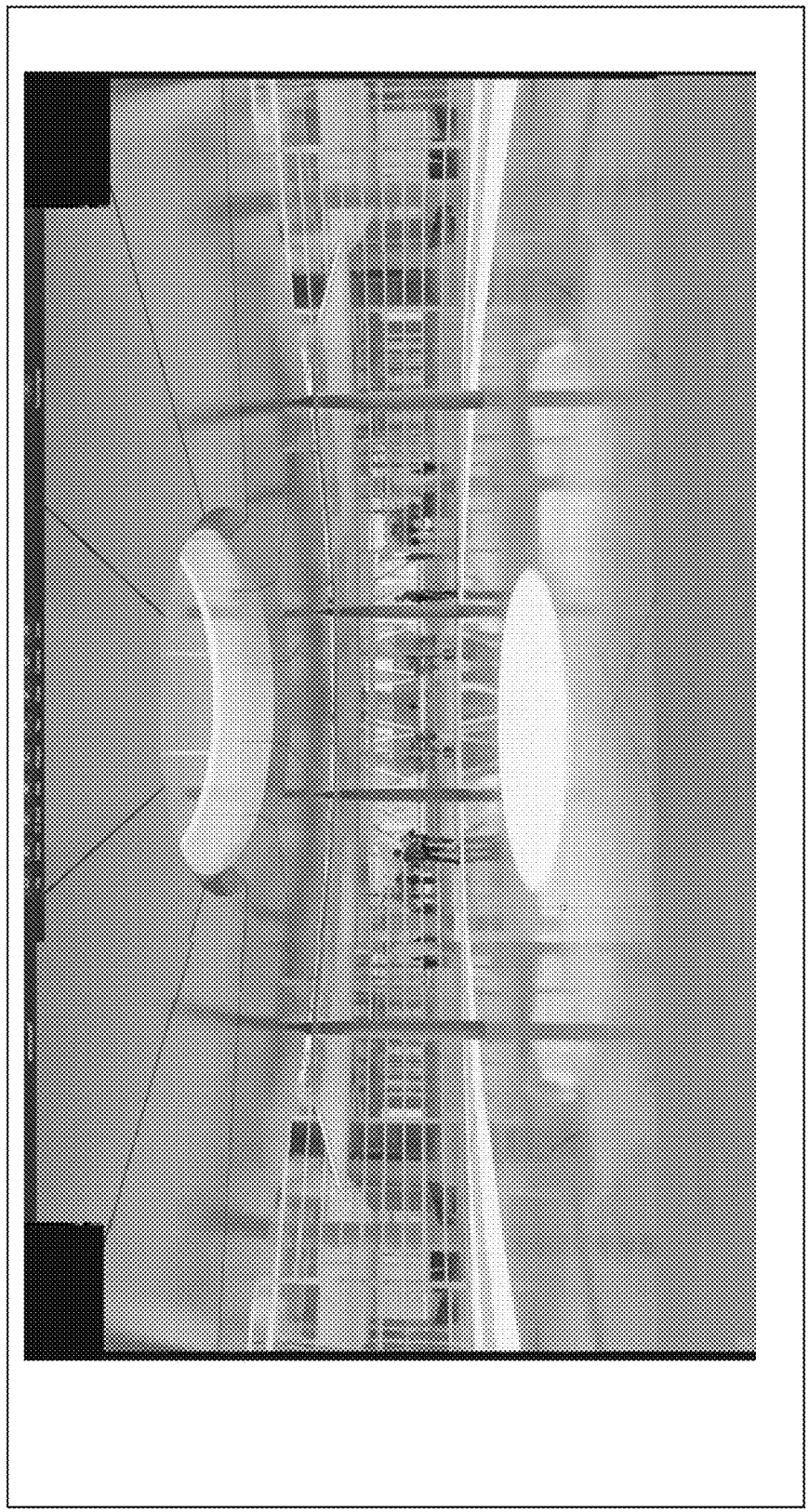
FIG. 8 shows a virtual conference space, in accordance with an example implementation of the present disclosure.

Referring now to FIG. 8, after a participant has selected one or more tracks for a particular event and has scheduled sessions, the participant can virtually attend sessions and enjoy the benefits thereof. FIG. 8 shows a virtual conference space in accordance with an example implementation of the present disclosure. As can be seen in FIG. 8, participants are virtually transported into attractive virtual spaces that feel real and provide access to premium event space and a mixed reality venue. The interface and options provided herein provide events that don't feel like standard or typical videoconferences or webinars. Instead, a new series of options and controls are provided for participants to navigate through events, including live presentations, and to share their reactions, respond to polls or questions, chat with each other, and otherwise network in ways that were previously unavailable. Further, as shown and described herein, live presentations can be provided in textual and/or in spoken format in virtually any language substantially in real-time, as processes including artificial intelligence routines, automatically transcribed, translate, and/or dub live presentations.

Figure 9:
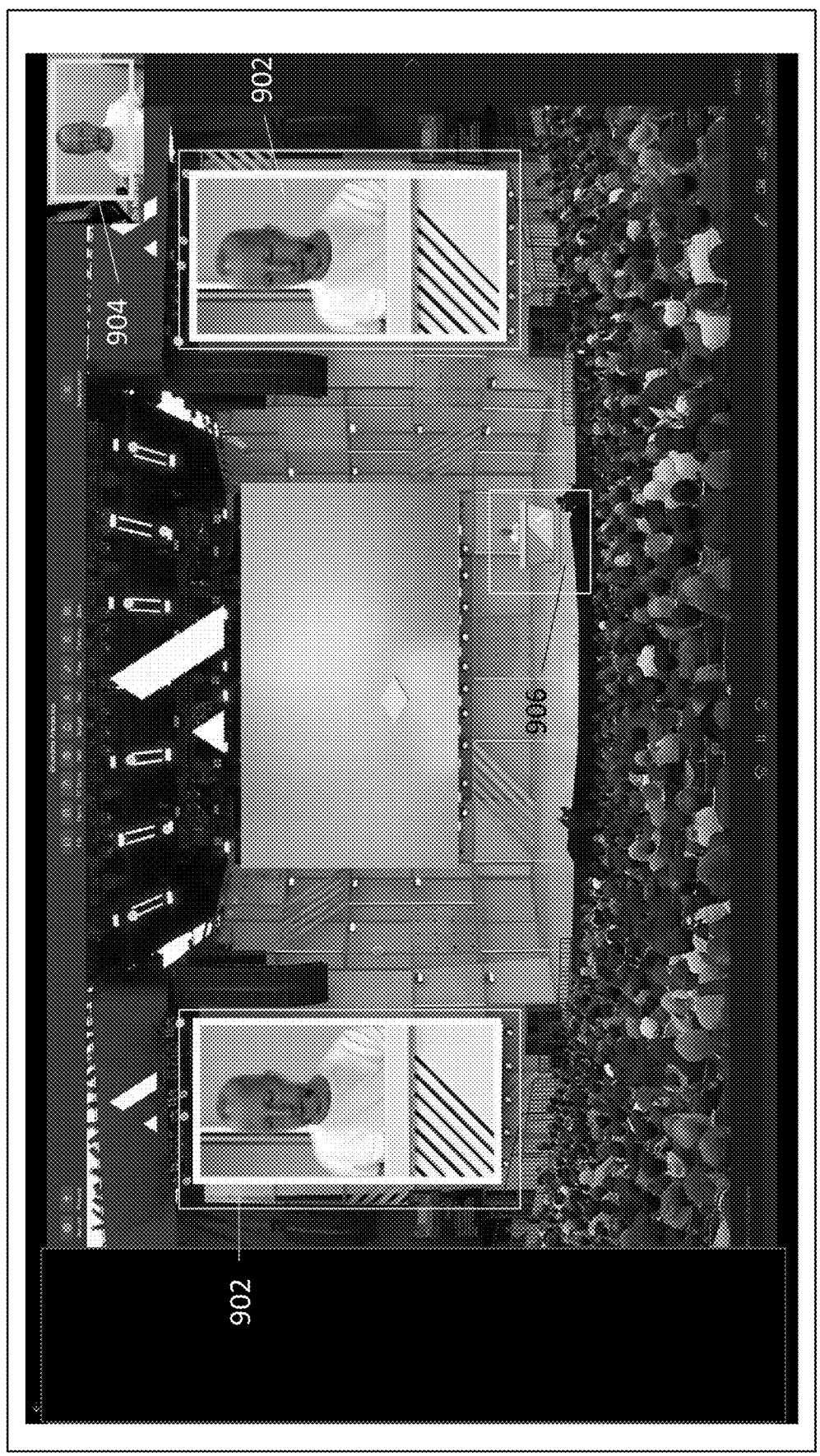
FIG. 9 illustrates a live event occurring in a virtual auditorium, in accordance with an example implementation.

Continuing with an example virtual event, FIG. 9 illustrates a live event occurring in a virtual auditorium. As can be seen in FIG. 9, a live audience is virtually provided in front of a virtual stage and two large virtual display screens located at each end of the stage. Further, a speaker is virtually provided on the stage at a podium and the speaker at the podium is displayed on the large display screens. Thus, and in accordance with an implementation of the present disclosure, a participant can virtually sit in an audience in an auditorium or other venue and virtually attend an event session with a vantage point substantially as shown in FIG. 9.

In addition to a participant being able to virtually attend an event session in the audience, a presenter (e.g., the speaker at the podium) can present in an event session virtually and remotely, including by never leaving his/her home office. As shown in FIG. 9, the presenter at the podium is displayed publicly, i.e., at the podium and on the two large display screens, and also privately, i.e., in the presenter's local computing device preview display (e.g., from the presenter's local laptop computer, desktop computer, tablet computer, smartphone, or other device) at the top right of FIG. 9. The present disclosure includes technology for visually removing the background from a received video feed (e.g., from the presenter), and replacing the background to appear seamlessly in a virtual set. For example, and as shown in FIG. 9, the background of the presenter's preview display shows a plain wall behind him. In the virtual set, however, the presenter at the podium appears to be placed seamlessly on the stage, including in the large display screens on either side of the stage. As shown in FIG. 9, the view of a presenter from the audience during a presentation can appear to be taken from one angle, while the view of the presenter in the large display screens appear to be taken from a different angle. Further, the view of the presenter in the presenter's local computing device preview display appears to be taken from yet a different angle. Thus, technology is provided herein to display the presenter (as shown in FIG. 9) from multiple camera angles, such as would only be possible in complicated multi-camera productions.

Figure 10:
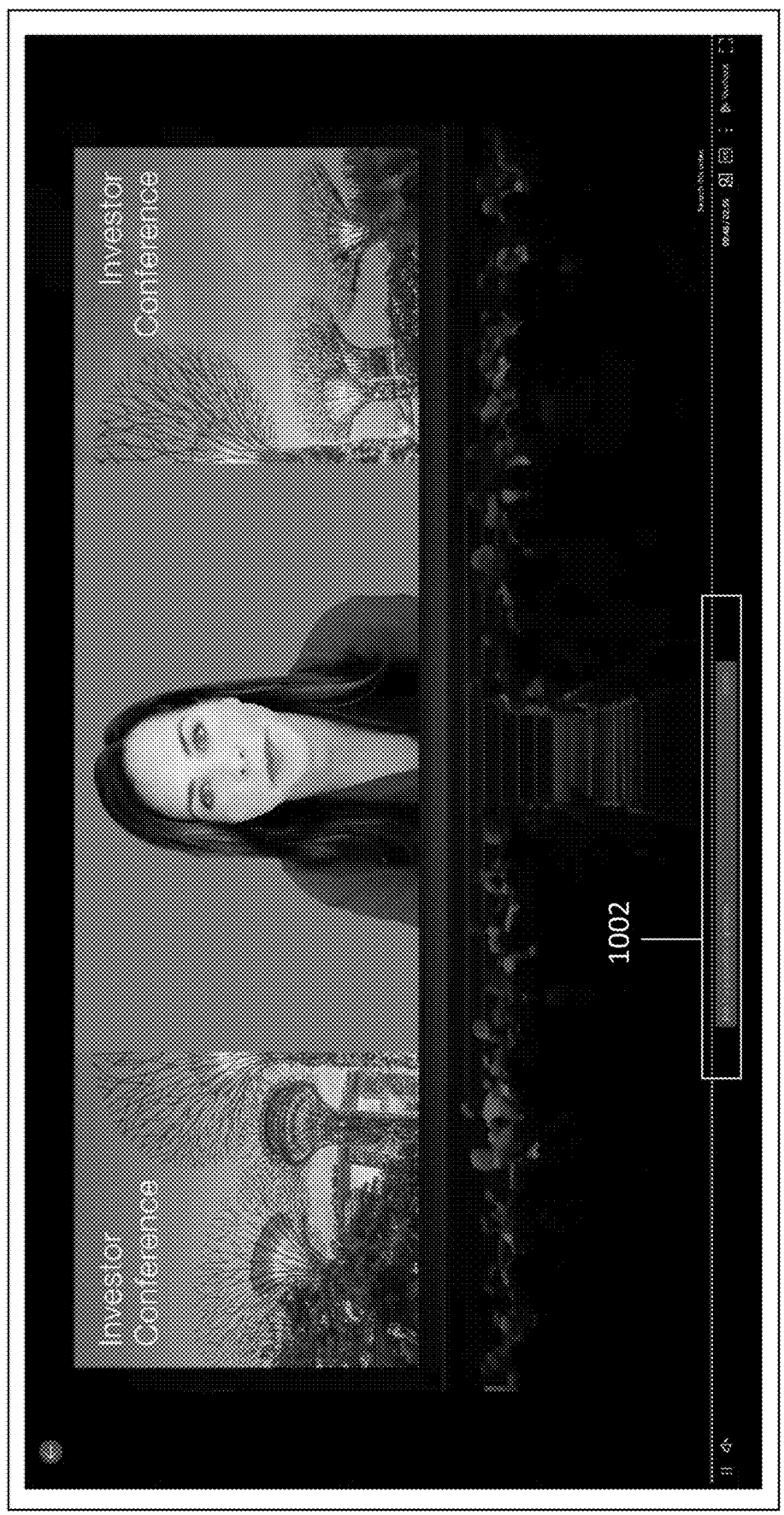
FIG. 10 illustrates another example event session from the vantage point of a participant sitting in an audience, in accordance with an example implementation.

FIG. 10 illustrates another example event session from the vantage point of a participant sitting in an audience, in accordance with an example implementation. In the example shown in FIG. 10, the session appears to take place on a large screen that spans along the width of a stage. The presenter in the example shown in FIG. 10 does not appear to be physically standing on stage, as the example in FIG. 9 does, but rather appears projected on the large screen. In the example shown in FIG. 10, an interactive text box control is provided at the bottom of the display screen that prompts the participant to submit the presenter a question. Using the text box control, participants in a large event session can interact in ways that were heretofore unavailable, including by reaching out to presenters directly during the course of an event session and substantially in real-time. This provides a close and personal experience for participants and presenters alike.

Figure 11:
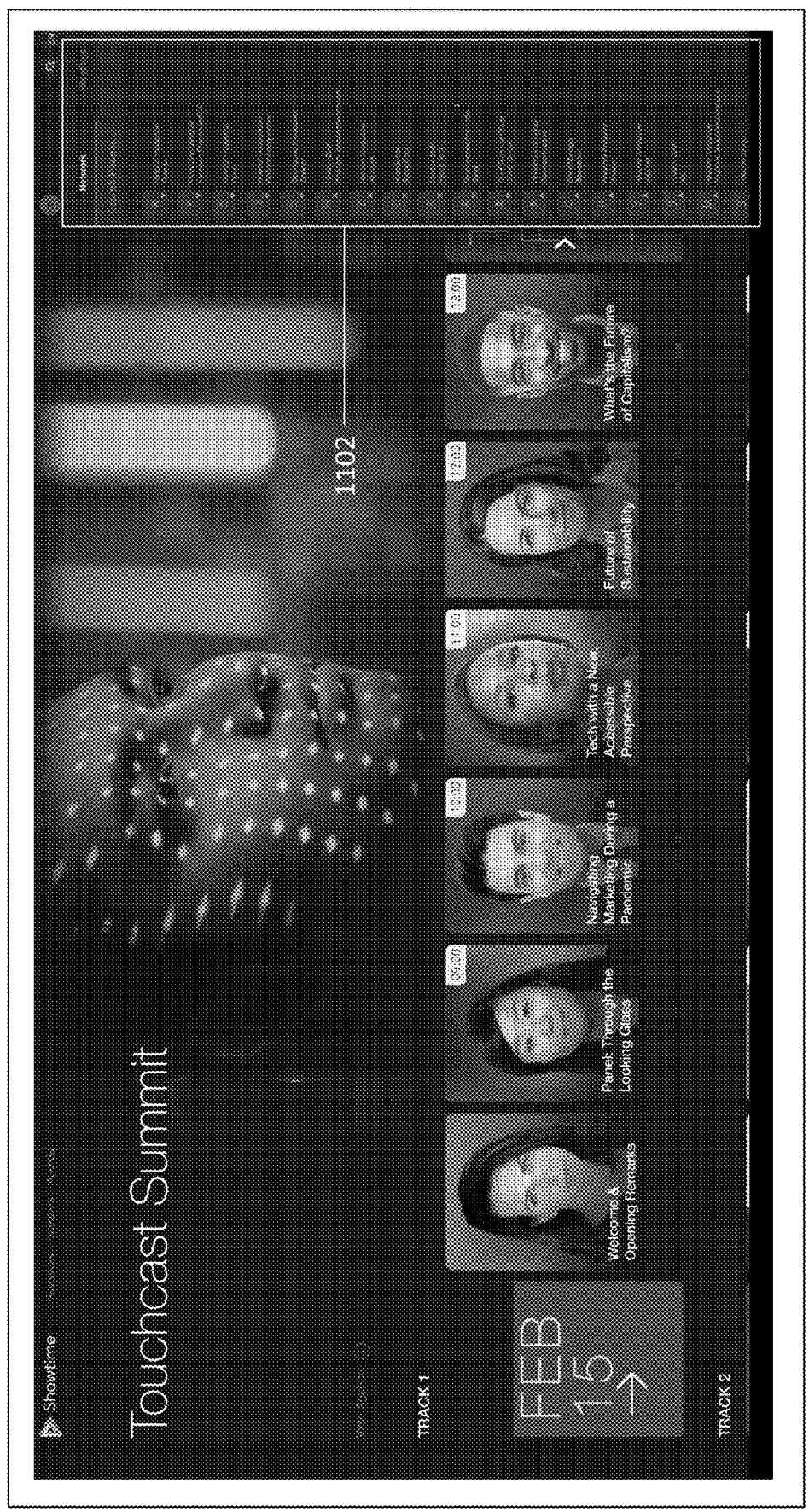
FIG. 11 shows an example selectable and searchable list of participants for a respective event and/or track, in accordance with an example implementation.

In addition to providing access to event sessions and close, personal interactivity with presenters, the present disclosure includes options for participants to network together. FIG. 11, for example, includes a selectable and searchable list of other participants for a respective event and/or track 304. The list of participants can include names, titles, and organizations or companies of the participants. In the example shown in FIG. 11, a letter representing the initial of each participant's first name is displayed with a small circle adjacent to the initial, which represents the participant's online presence during an event. Providing a selectable list of participants in this way provides for directed and particular forms of networking that would otherwise be unavailable to those who attend events.

Figure 12A:
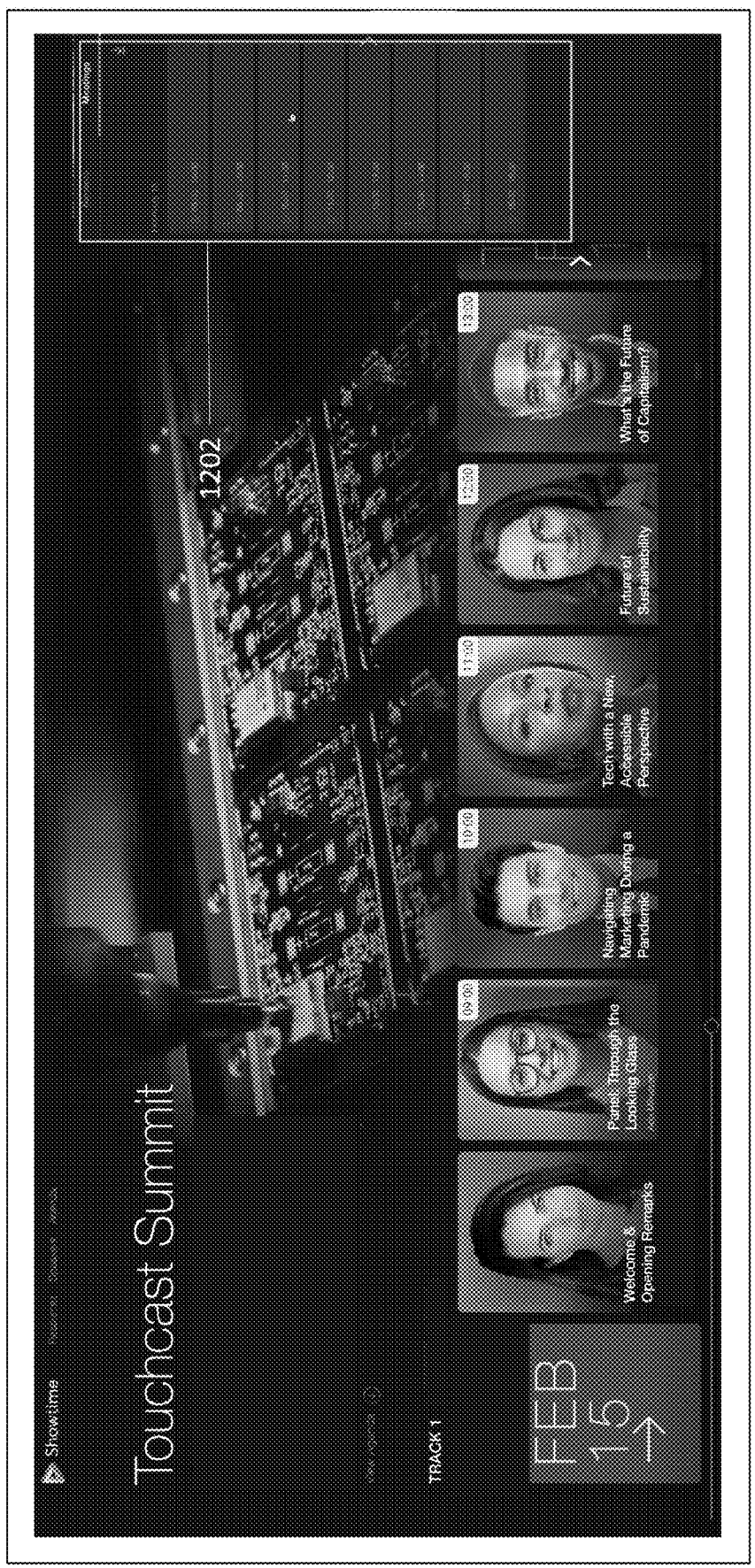
FIG. 12A illustrates an example implementation that includes graphical screen display providing a list of meetings sponsored by or in association with companies and on specific dates and times, in accordance with an example implementation.
Figure 12B:
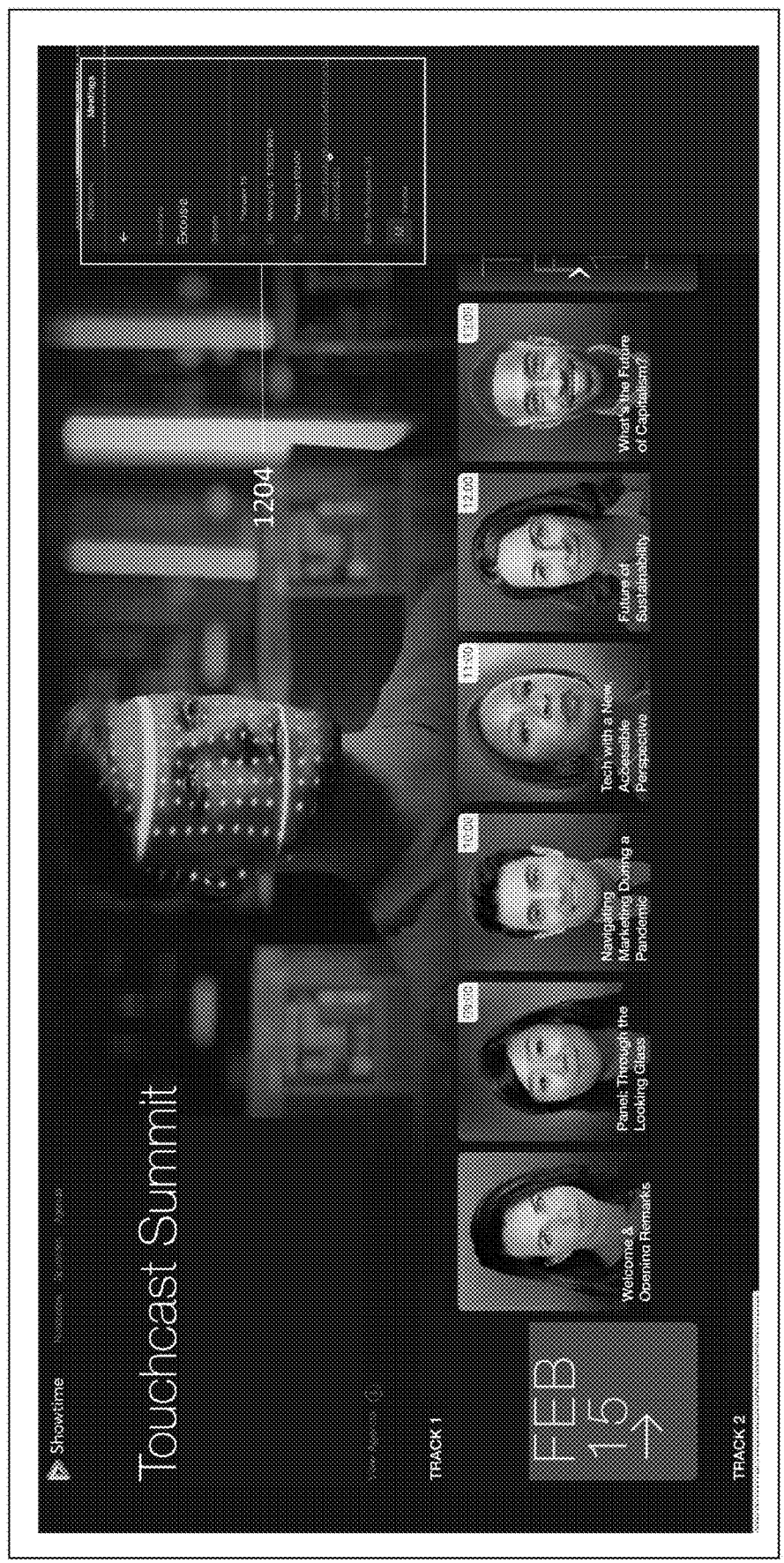
FIG. 12B illustrates a selectable list of other participants in a selected meeting, including the initial of the other participants' first names, in accordance with an example implementation.

In addition to networking, the present disclosure provides improved access for participants to schedule and attend meetings. FIG. 12A illustrates an example implementation that includes graphical screen display providing a list of meetings sponsored by or in association with companies and on specific dates and times. Once a specific meeting is selected, information associated with meeting, such as the date and time, a meeting ID and password, and a hyperlink to join the meeting can be provided (FIG. 12B). Further, and as illustrated in FIG. 12B, a selectable list of other participants in a selected meeting, including the initial of the other participants' first names, is also provided.

Figure 13:
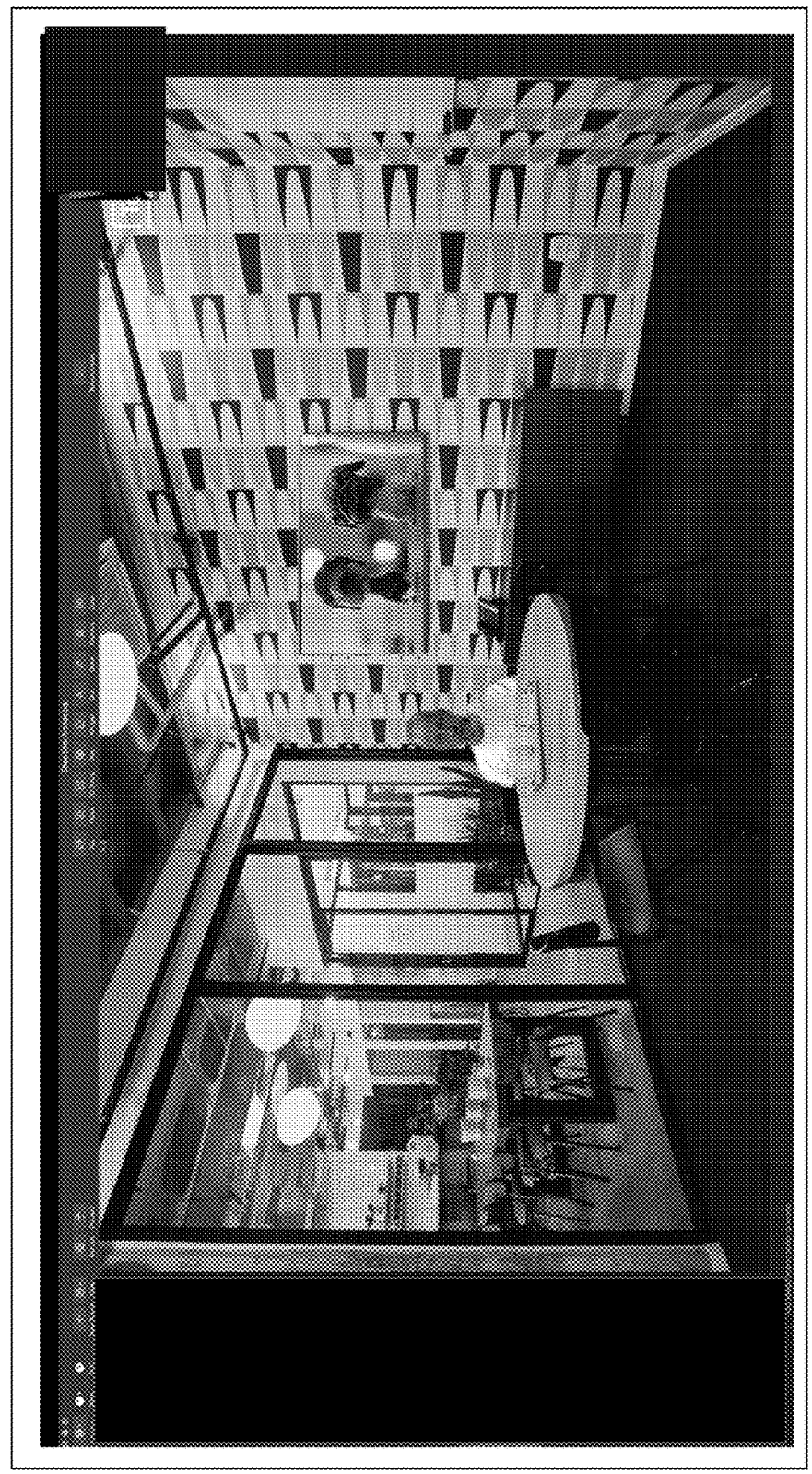
FIG. 13 illustrates an example virtual meeting, such as scheduled and attended as a function of features and options set forth herein, such as illustrated in FIGS. 12A and 12B, in accordance with an example implementation.

FIG. 13 illustrates an example virtual meeting, such as scheduled and attended as a function of features and options set forth herein, such as illustrated in FIGS. 12A and 12B, in accordance with an example implementation. As described herein, the present application disclosure includes technology to mask background from video feed received from a participant and to replace the background. In the example shown in FIG. 13, the participant is shown sitting at a desk, with the background seamlessly removed and the participant within a conference room. The presenter is also shown from the view of his local computing device's preview display (e.g., from the presenter's local laptop computer, desktop computer, tablet computer, smartphone, or other device) at the top right of FIG. 13, the present disclosure provides for a real-time representation of participants appearing in virtual sets using a live video feed received from the participant, and without the participant leaving his or her home office.

Thus, as shown and described herein, technology is provided for interactive and virtual events that combine mixed reality and artificial intelligence to create an illusion of an extremely expensive production even when everyone connects from their respective home offices, and presenters are transported from home offices to gorgeous virtual spaces that feel real.

Further, the teachings herein provide for mixed reality venues as well as the ability to create a digital twin of a participant's own space, thereby providing virtual public events with an unforgettable multi-camera production value, regardless of where presenters speak, and participants (e.g., attendees) are located.

In addition, as speakers present during an event session in real-time, programming routines employing artificial intelligence can transcribe, translate, and dub them automatically, allowing participants to access and attend sessions from all over the globe. Further, the present disclosure provides solutions for allowing people to be introduced and spend time together in close meetings. From live viewing parties to chance encounters, conversations and prescheduled meetings, the present disclosure brings participants together even when they are far apart.

Unlike existing event platforms, every aspect of an event is elevated, including from initial planning stages, to management, and to production. Moreover, after an event is over related content lives on. In one or more implementations, presentations and associated materials made or provided during event sessions can be provided on demand, including in various formats that are generated substantially in real-time as event sessions occur.

Figure 14:
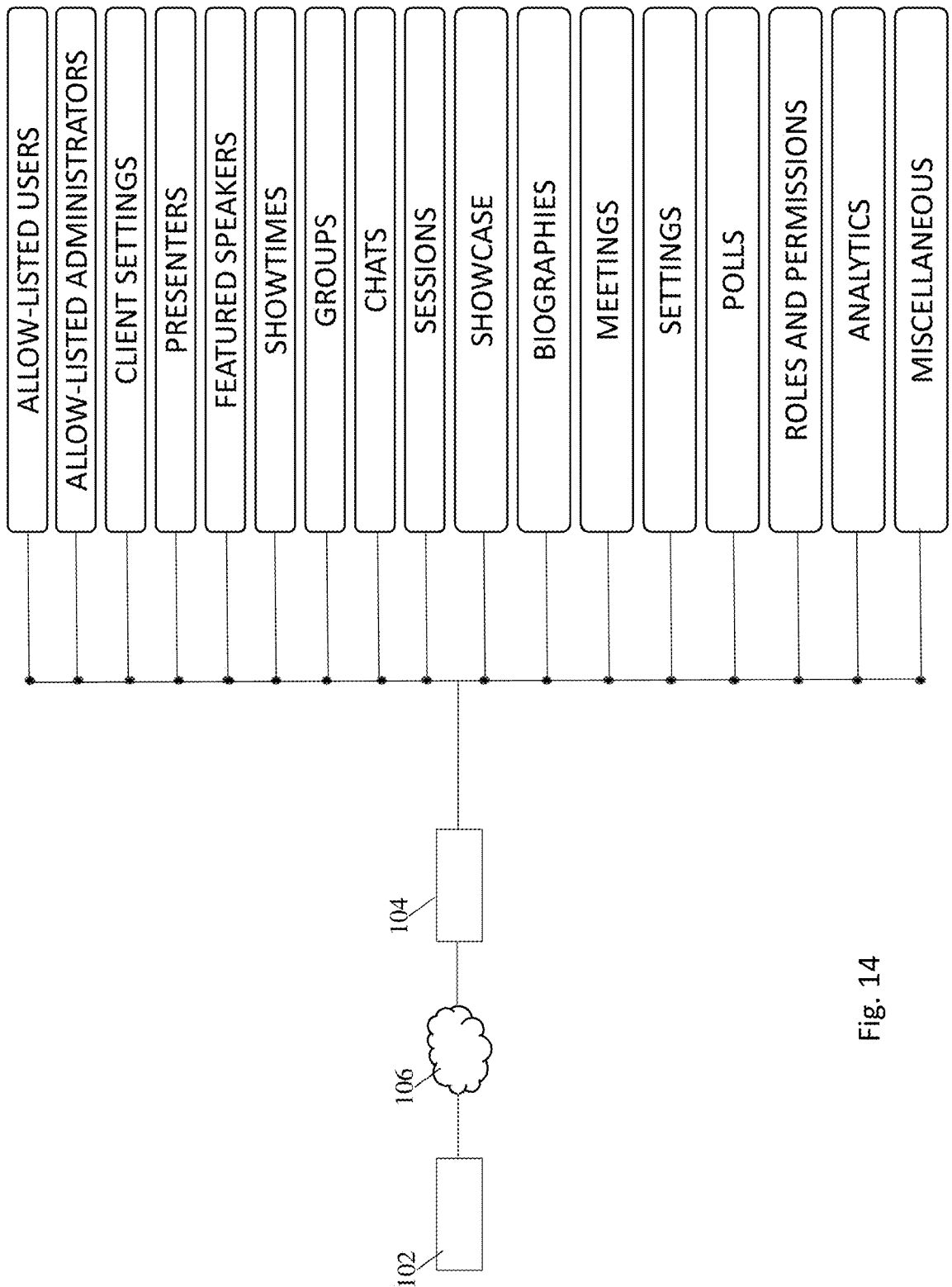
FIG. 14 illustrates modules that are usable to manage information associated with events, in accordance with an example implementation.

Although much of the description and figures described to this point have focused on event sessions and experiences of participants therein, the present disclosure includes features and functionality associated with managing events and data associated therewith. FIGS. 14-30 illustrate aspects of the present disclosure associated with setting up and managing new and existing events. FIG. 14 illustrates modules that are usable to manage information associated with events, including with regard to users, administrators, client settings, presenters, featured speakers, showtimes, groups, chats, sessions, showcases, biographies, meetings, settings, polls, rolls and permissions, analytics, and other miscellaneous information.

Figure 15:
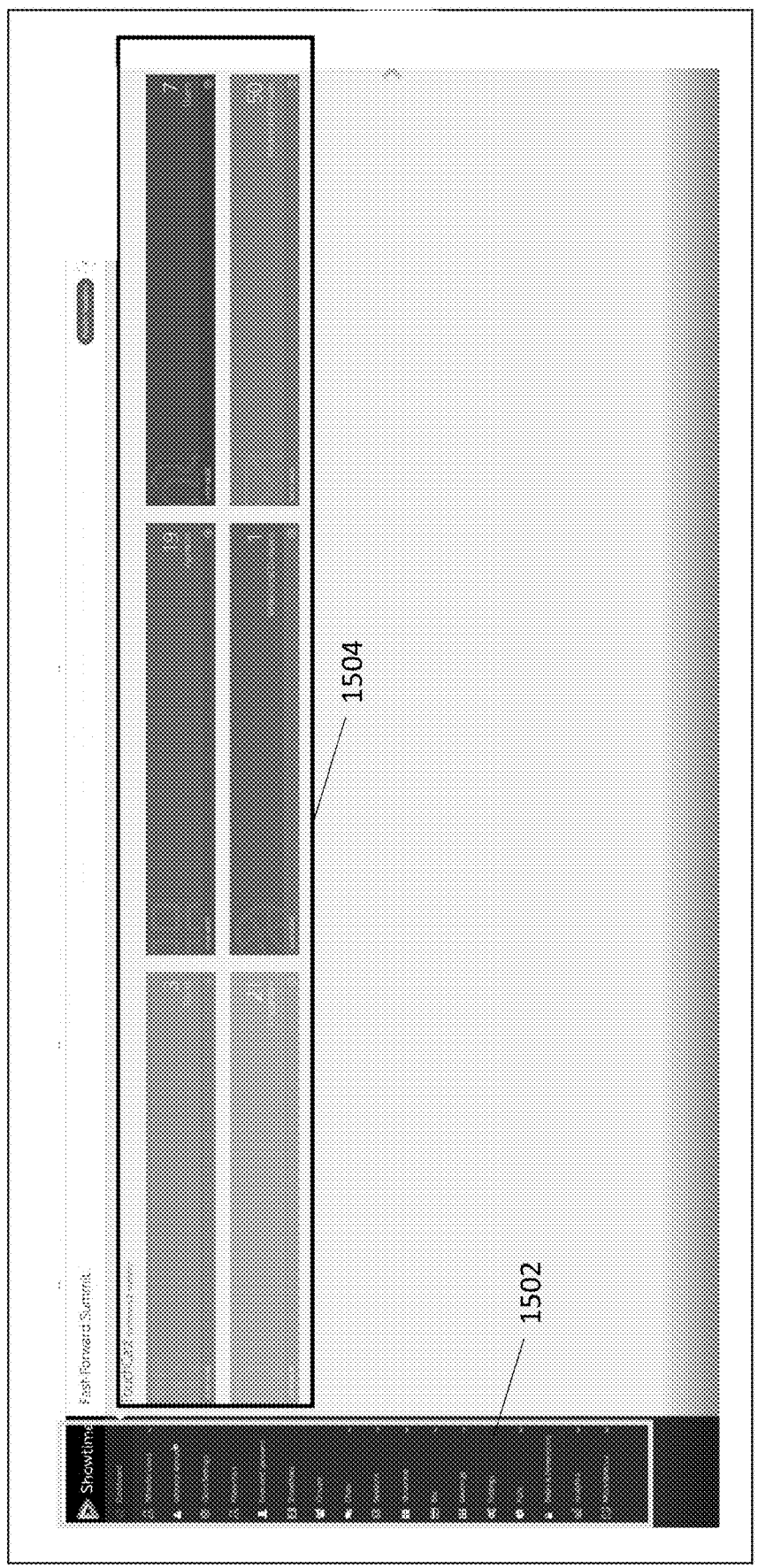
FIG. 15 illustrates an example graphical user interface display screen that provides a dashboard view that includes selectable options associated with the respective modules shown and described above with regard to FIG. 14.

FIG. 15 illustrates an example graphical user interface display screen that provides a dashboard view that includes selectable options associated with the respective modules shown and described above with regard to FIG. 14, in accordance with an example implementation. In the example shown in FIG. 15, selectable options are available for viewing and editing data associated with 3 tracks, 21 presenters, 19 agendas, 1 allow-listed domains, 7 users, and 50 white listed emails. Options are available for each of these and other modules to edit corresponding data, such as to add or delete records, or modify existing records. More generally, a selectable list of the respective modules described and shown above, with regard to FIG. 14, is provided in a vertical column set forth at the left of the graphical user interface display screen of FIG. 15. A discussion regarding the respective selectable options with regard to the modules identified in FIG. 14 is now provided.

Figure 16:
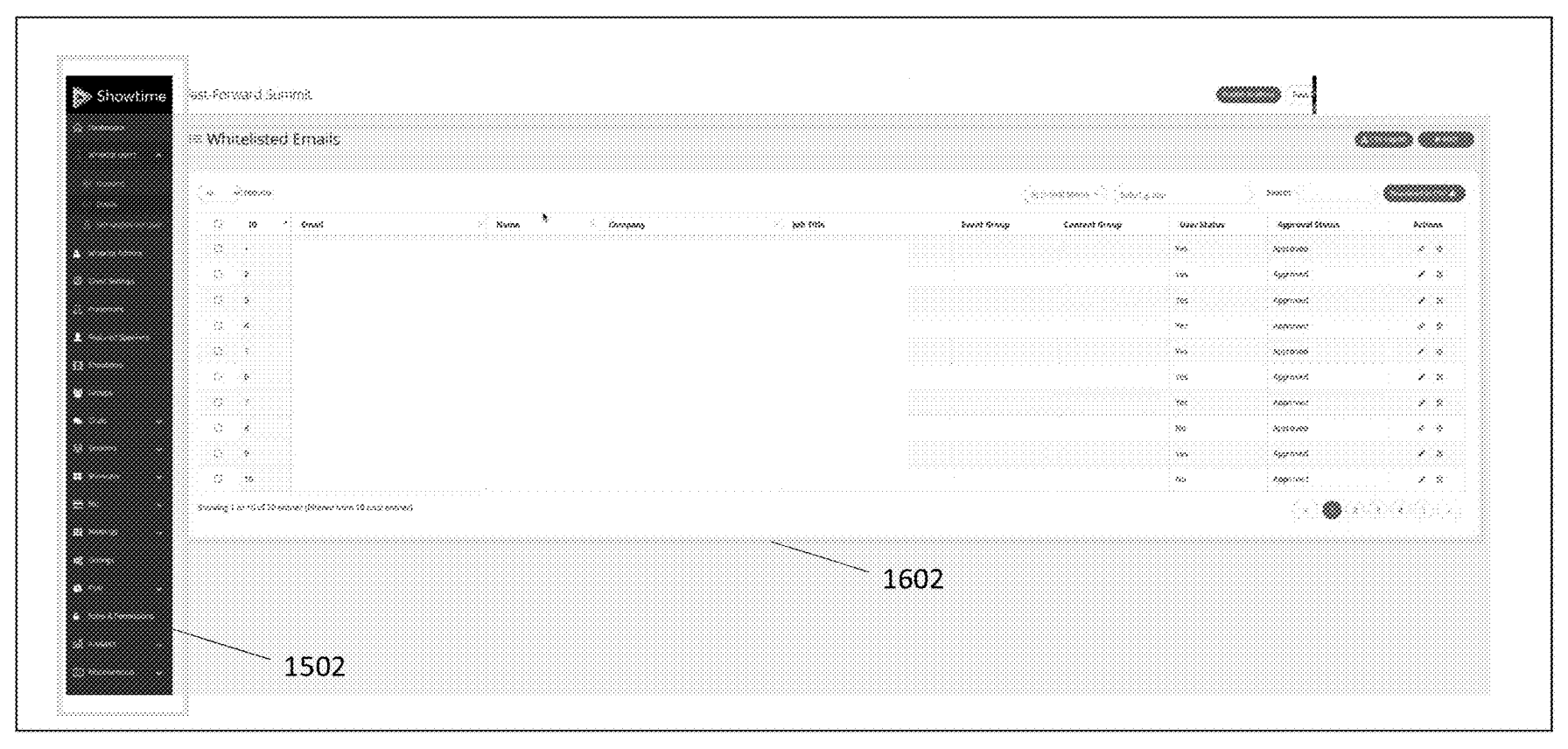

FIG. 16 illustrates an example graphical user interface display screen for a user who selects an option for the allow-listed emails module, in accordance with an example implementation. As shown in FIG. 16, a list of respective email addresses, and corresponding names, companies, job titles, event groups, user status, approval status, and editable actions is provided for each of a plurality of individuals. Further, a selectable checkbox is provided for each entry, for which editable actions, such as to delete a row or edit an entry, are available. Further, new allow-listed emails can be added using graphical screen controls, such as buttons or checkboxes, provided in the graphic user interface display screen shown in FIG. 16.

Figure 17:
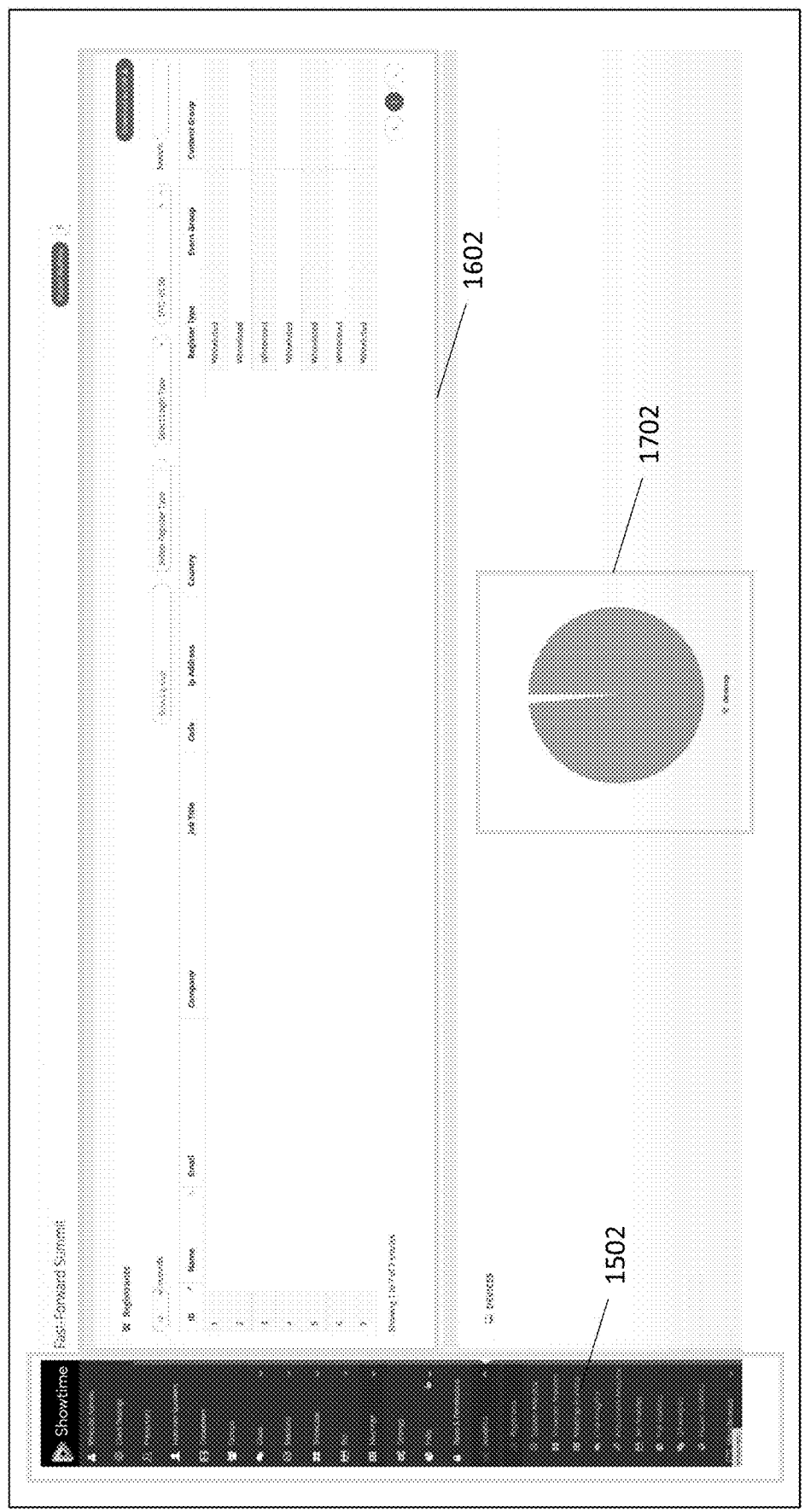
FIG. 17 illustrates an example graphical user interface display screen that includes options for data entry/editing for registrants of a respective event, in accordance with an example implementation.
Figure 18:
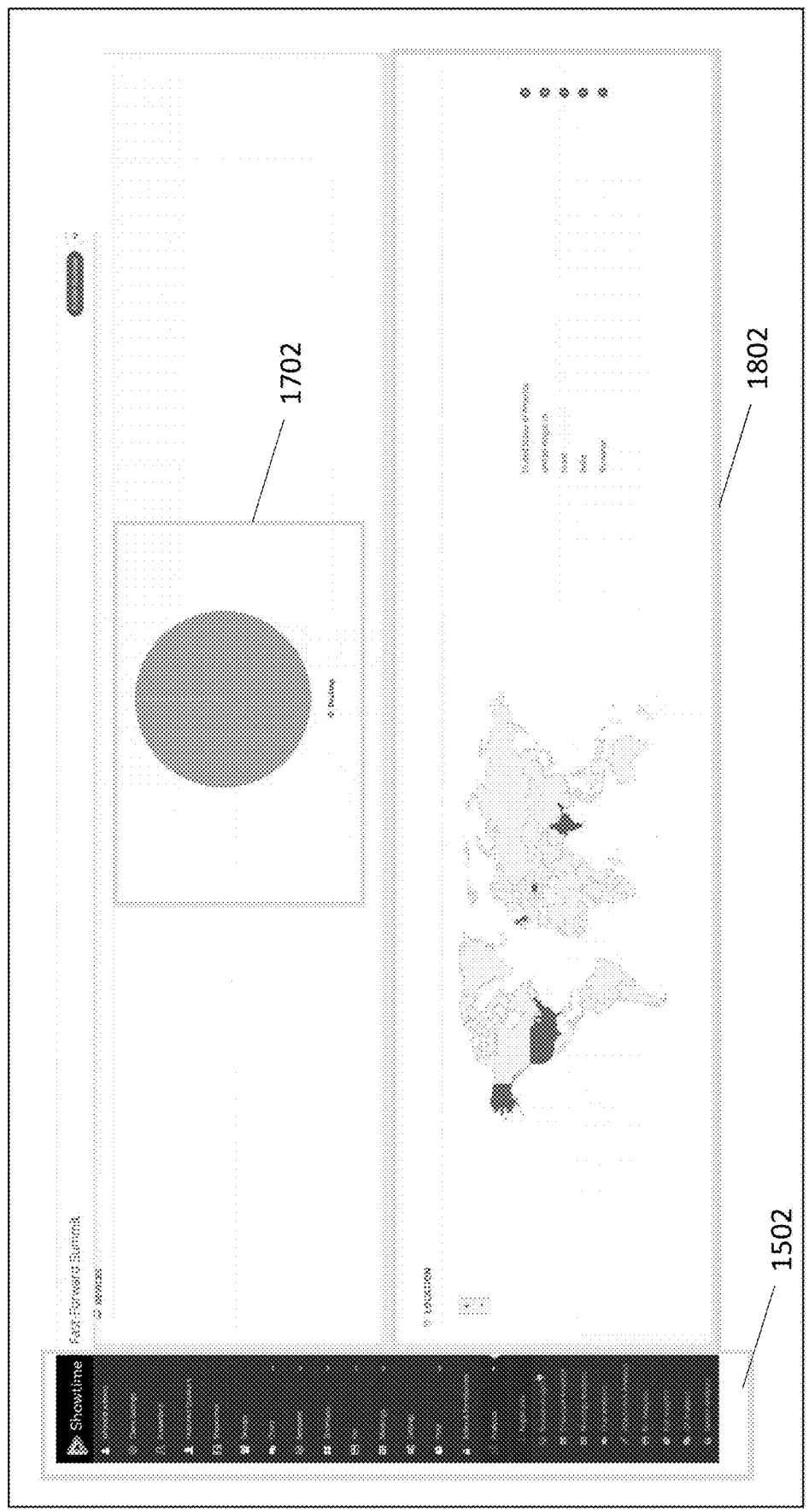
FIG. 18 illustrates graphical interfaces, including a simple pie chart, such as shown in FIG. 17.

FIG. 17 illustrates an example graphical user interface display screen that includes options for data entry/editing for registrants of a respective event, in accordance with an example implementation. For example, columns are provided for respective names, email addresses, company names, job titles, codes, IP addresses, countries, dates and times of previous logins, register types (e.g., allow-listed), event groups, and content groups. Further, a simple pie chart is illustrated in FIG. 17 to represent the kinds of user computing devices that are respectively used by the registrants. FIG. 18 illustrates graphical interfaces, including a simple pie chart such as shown in FIG. 17 and a map of the globe showing respective countries and numbers of devices therefrom. Further, new analytics can be added using graphical screen controls, such as buttons or checkboxes, provided in the graphic user interface display screen shown in FIG. 19.

Figure 19:
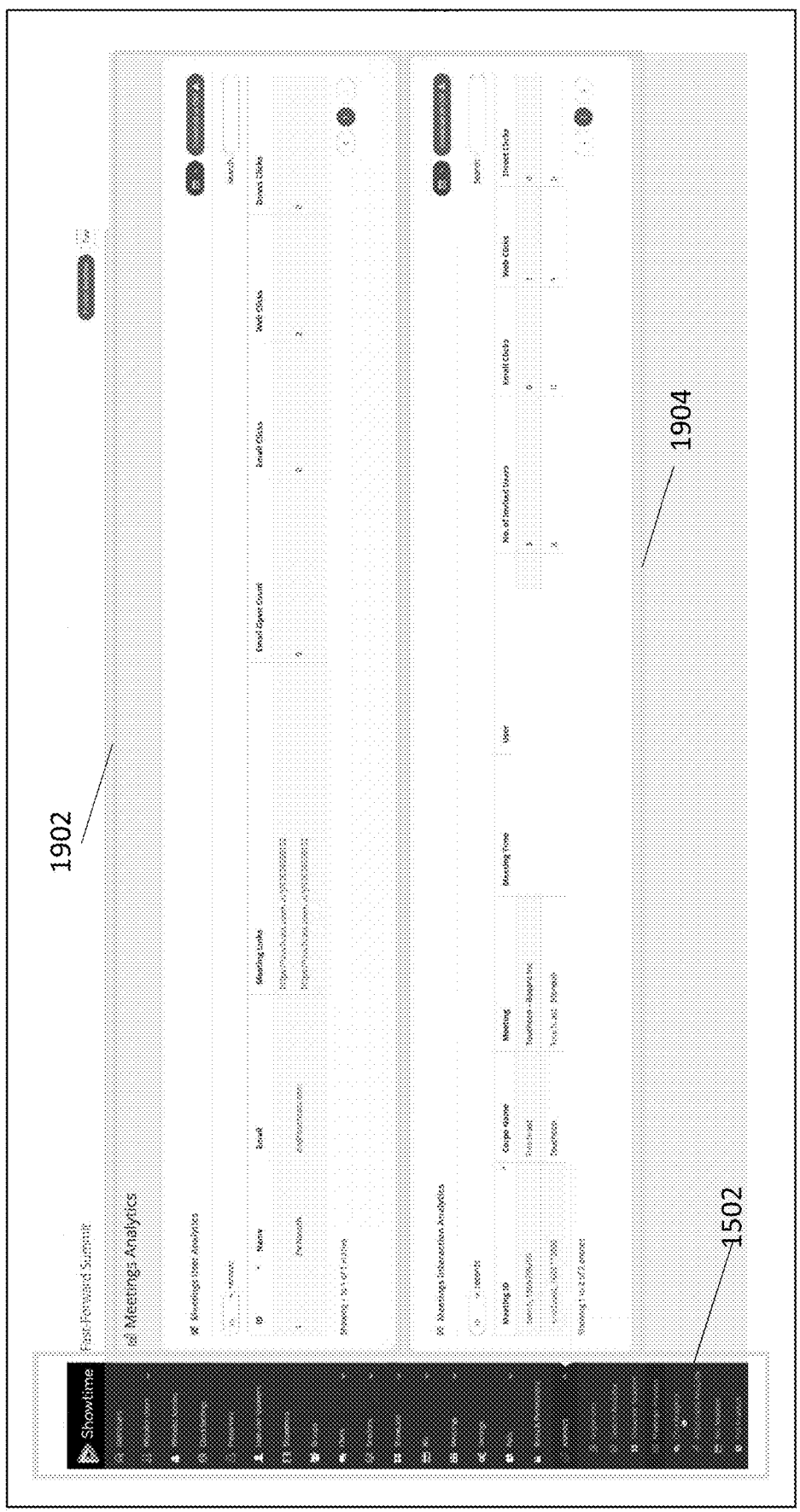
FIG. 19 illustrates an example graphical user interface display screen that includes options for data entry/editing in connection with meetings analytics, in accordance with an example implementation.

FIG. 19 illustrates an example graphical user interface display screen that includes options for data entry/editing in connection with meetings analytics, including analytics associated with users and with user interactions, in accordance with an example implementation. For example, and with regard to users, information regarding names, email addresses, hyperlinks to meetings, counts of email openings, email clicks, web clicks, and direct clicks can be displayed and/or edited. For example, and with regard to user interactions, information regarding meeting identifiers, corporate names, meeting names, meeting times, emails users attending meetings, user IDs, number of invited users, number of email clicks, number of web clicks, and number of direct clicks can be displayed and/or edited. Further, new analytics can be added using graphical screen controls, such as buttons or checkboxes, provided in the graphic user interface display screen shown in FIG. 19.

Figure 20:
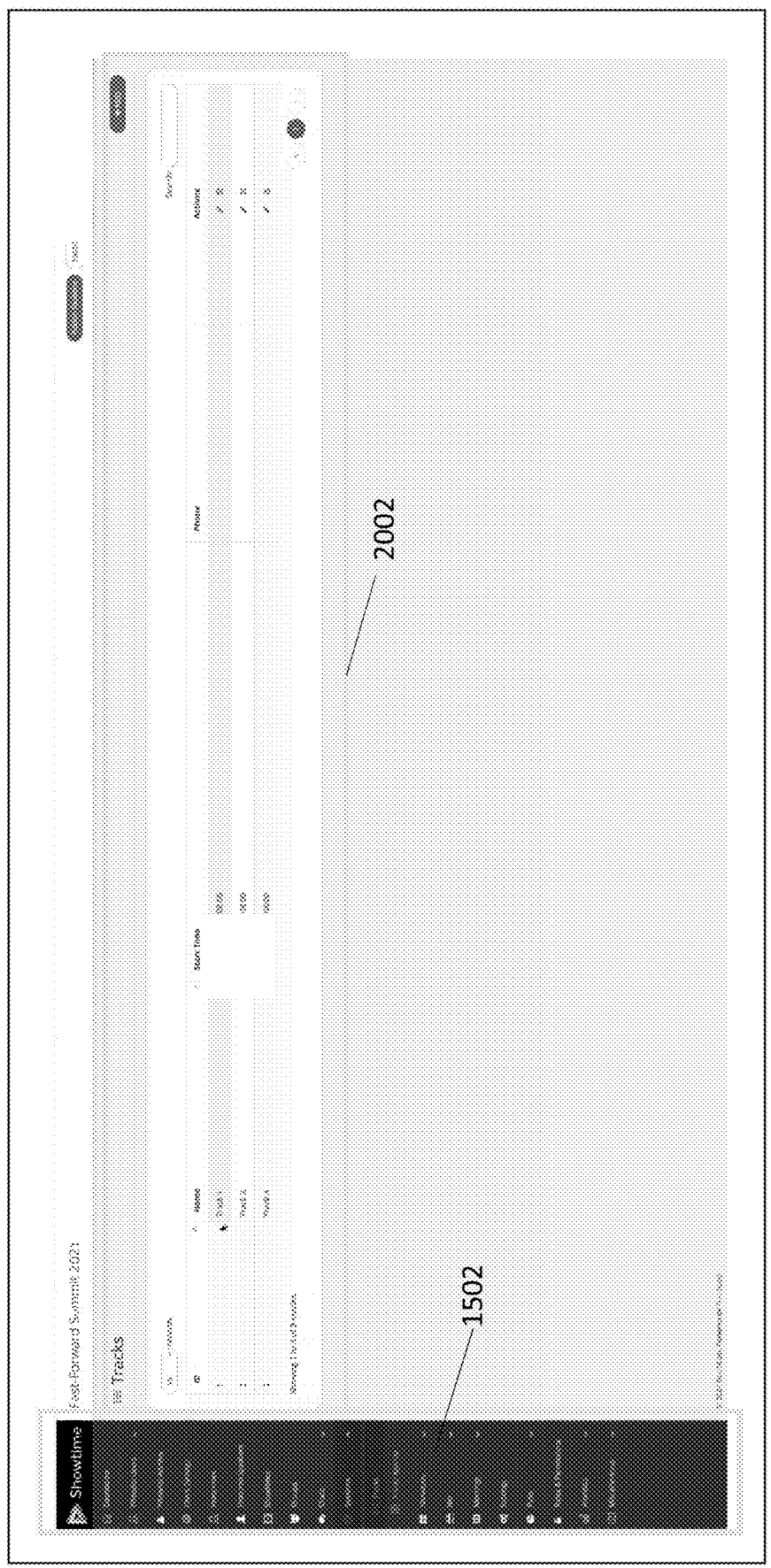
FIG. 20 illustrates an example graphic user interface display screen that includes analytic information associated with event tracks, in accordance with an example implementation.

FIG. 20 illustrates an example graphic user interface display screen that includes analytic information associated with event tracks, in accordance with an example implementation. As shown in FIG. 20, track names, identifiers, start times, and telephone numbers can be displayed and/or edited. Further, new tracks can be added using graphical screen controls, such as buttons or checkboxes, provided in the graphic user interface display screen shown in FIG. 20.

Figure 21:
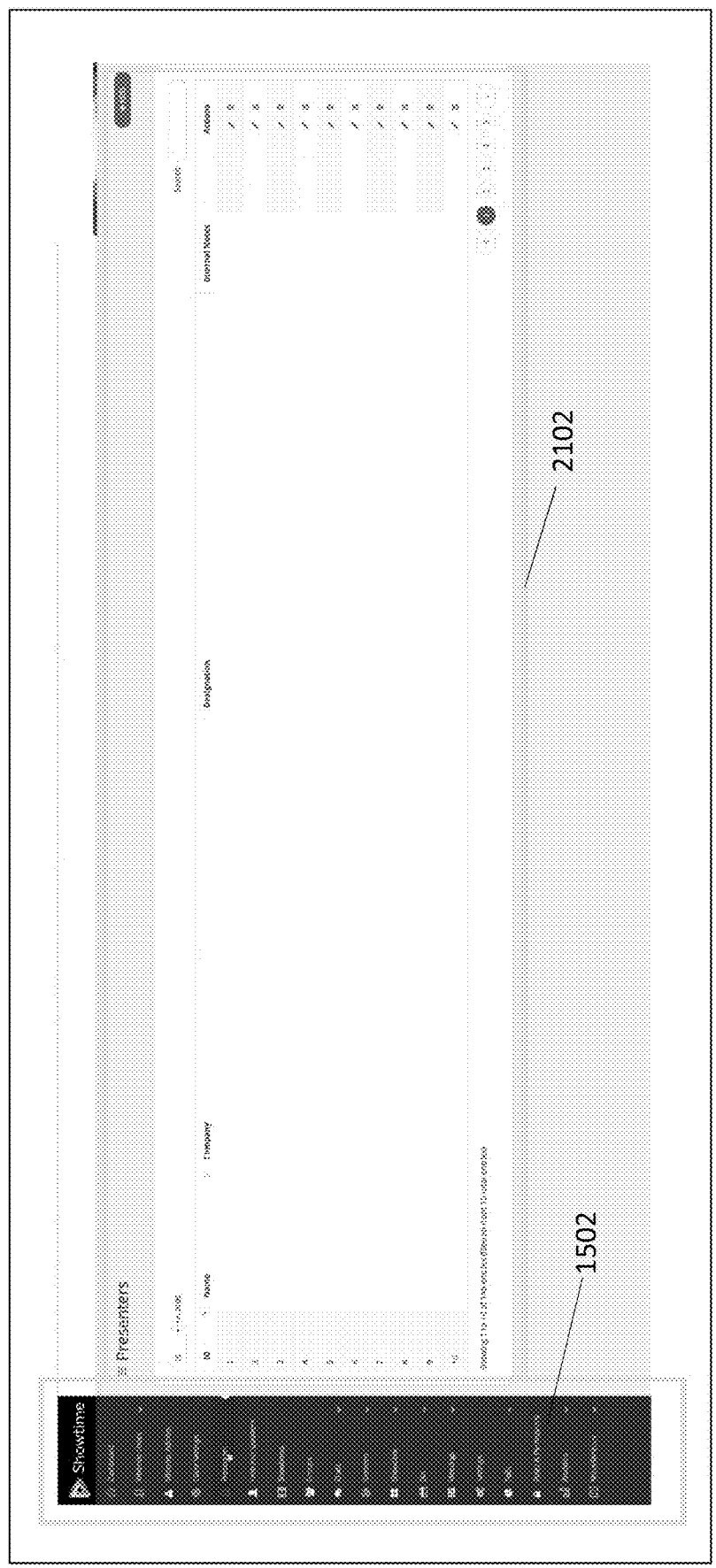
FIG. 21 illustrates an example graphic user interface display screen that includes information associated with presenters, in accordance with an example implementation.

FIG. 21 illustrates an example graphic user interface display screen that includes information associated with presenters, in accordance with an example implementation. As shown in FIG. 21, information associated with names, companies, title or designation, and internal notes can be displayed and/or edited. Further, new presenters can be added using graphical screen controls, such as buttons or checkboxes, provided in the graphic user interface display screens shown in FIG. 21.

Figure 22:
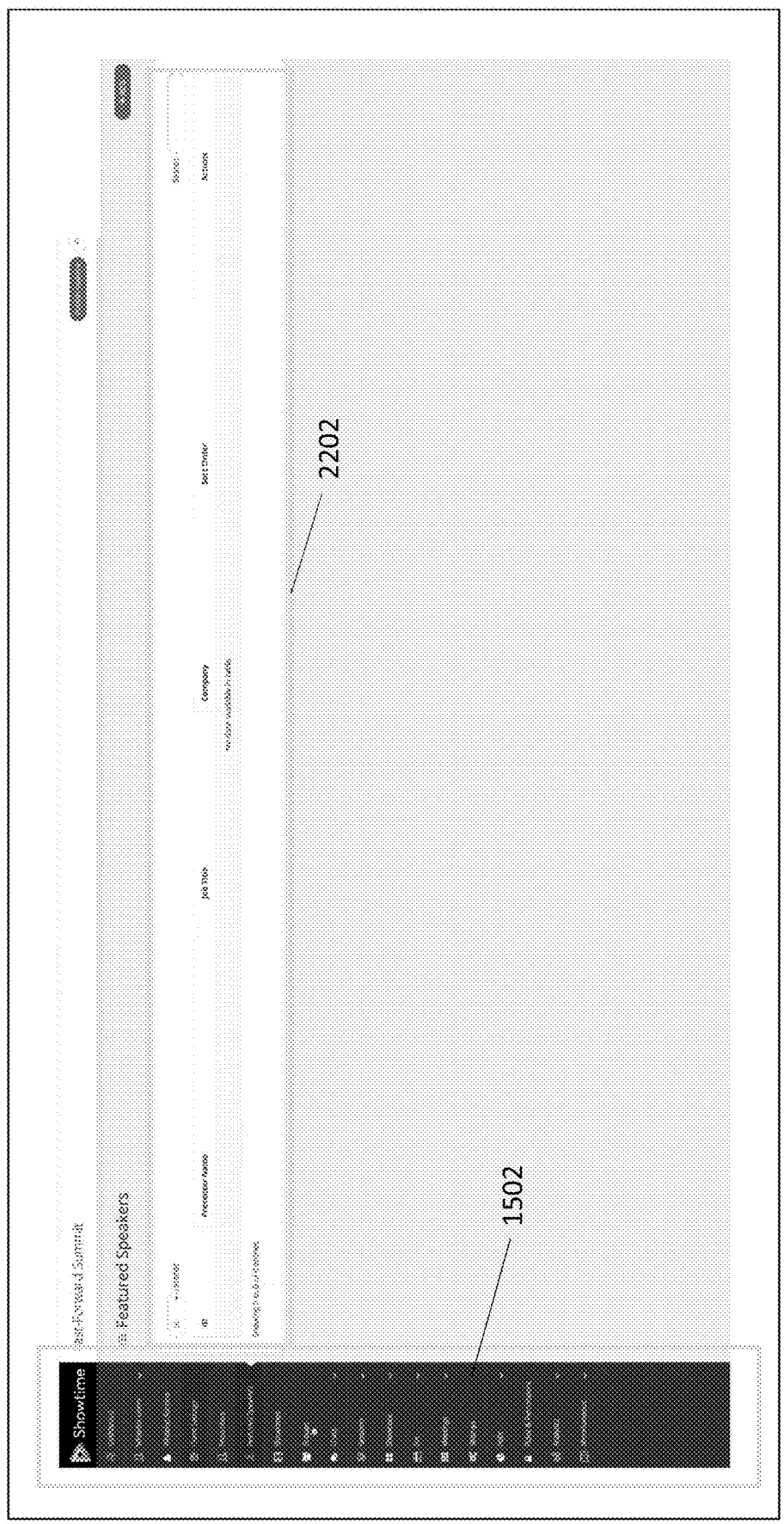
FIG. 22 illustrates an example graphic user interface display screen that includes information associated with featured speakers, in accordance with an example implementation.

FIG. 22 illustrates an example graphic user interface display screen that includes information associated with featured speakers, in accordance with an example implementation. As shown in FIG. 21, information associated with names, title or designation, companies, sort order, and actions can be displayed and/or edited. Further, new speakers can be added using graphical screen controls, such as buttons or checkboxes, provided in the graphic user interface display screens shown in FIG. 22.

Figure 23:
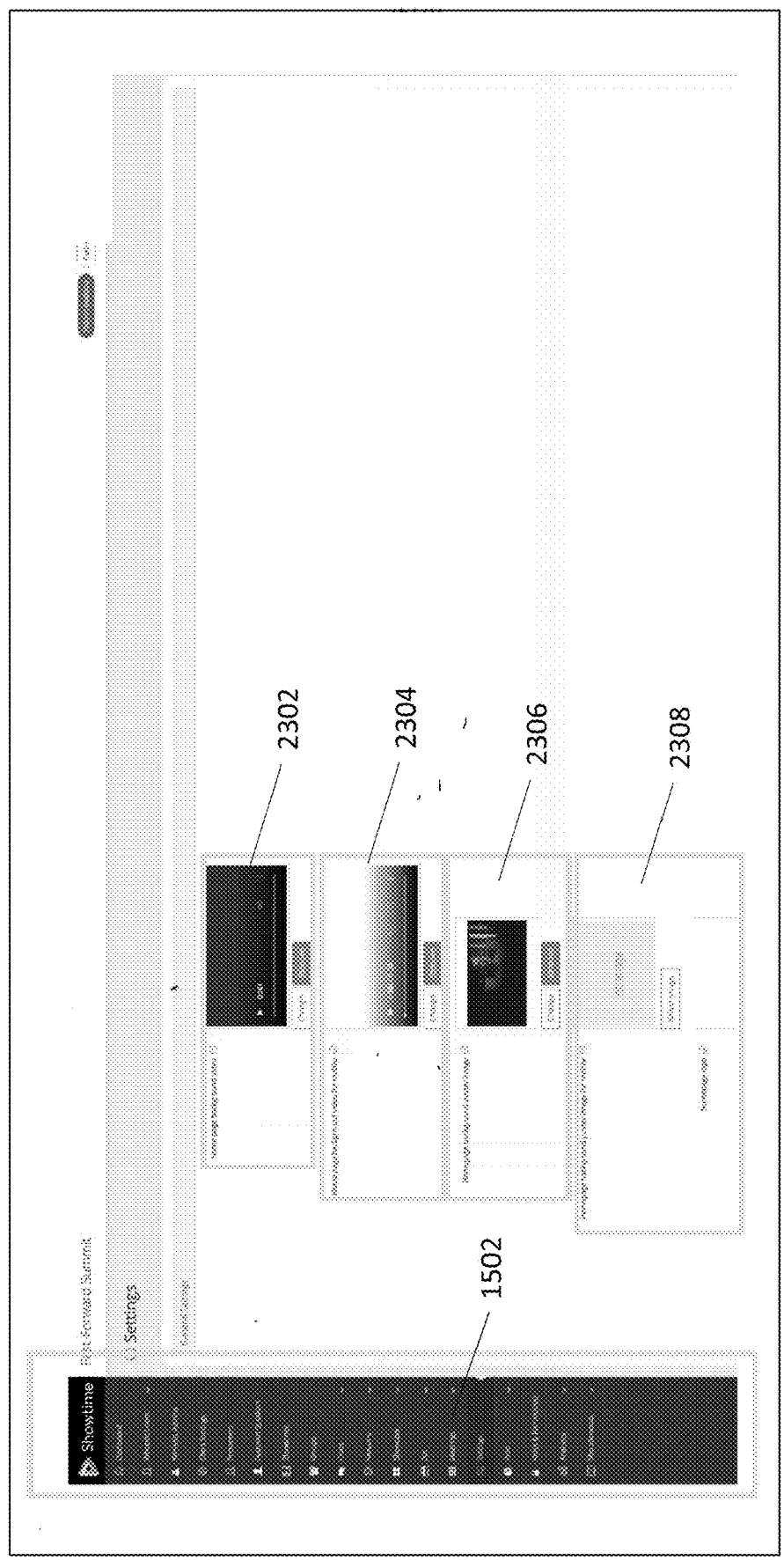
FIG. 23 illustrates an example graphic user interface display screen that includes options for general settings in connection with event data management and presentation, in accordance with an example implementation.

FIG. 23 illustrates an example graphic user interface display screen that includes options for general settings in connection with event data management and presentation, in accordance with an example implementation. For example, options are provided in FIG. 23 for adding, changing, and/or removing a home page background video, which can be made available for users who visit a home page associated with an event, track, session, or other feature of an event shown and described herein. Further, options are provided for a corresponding home page background video for users who are operating mobile computing devices, such as smartphones, tablet computers or the like. In addition to video, options are available in FIG. 23 for a user to add, change, or remove a home page background poster image, which can serve as a wallpaper background for an event, track, session, or other feature of an event shown and described herein. Similarly, a home page background poster image can be added, changed, or removed for a home page background poster image for users who are operating mobile computing devices, such as smartphones, tablet computers or the like.

Figure 24:
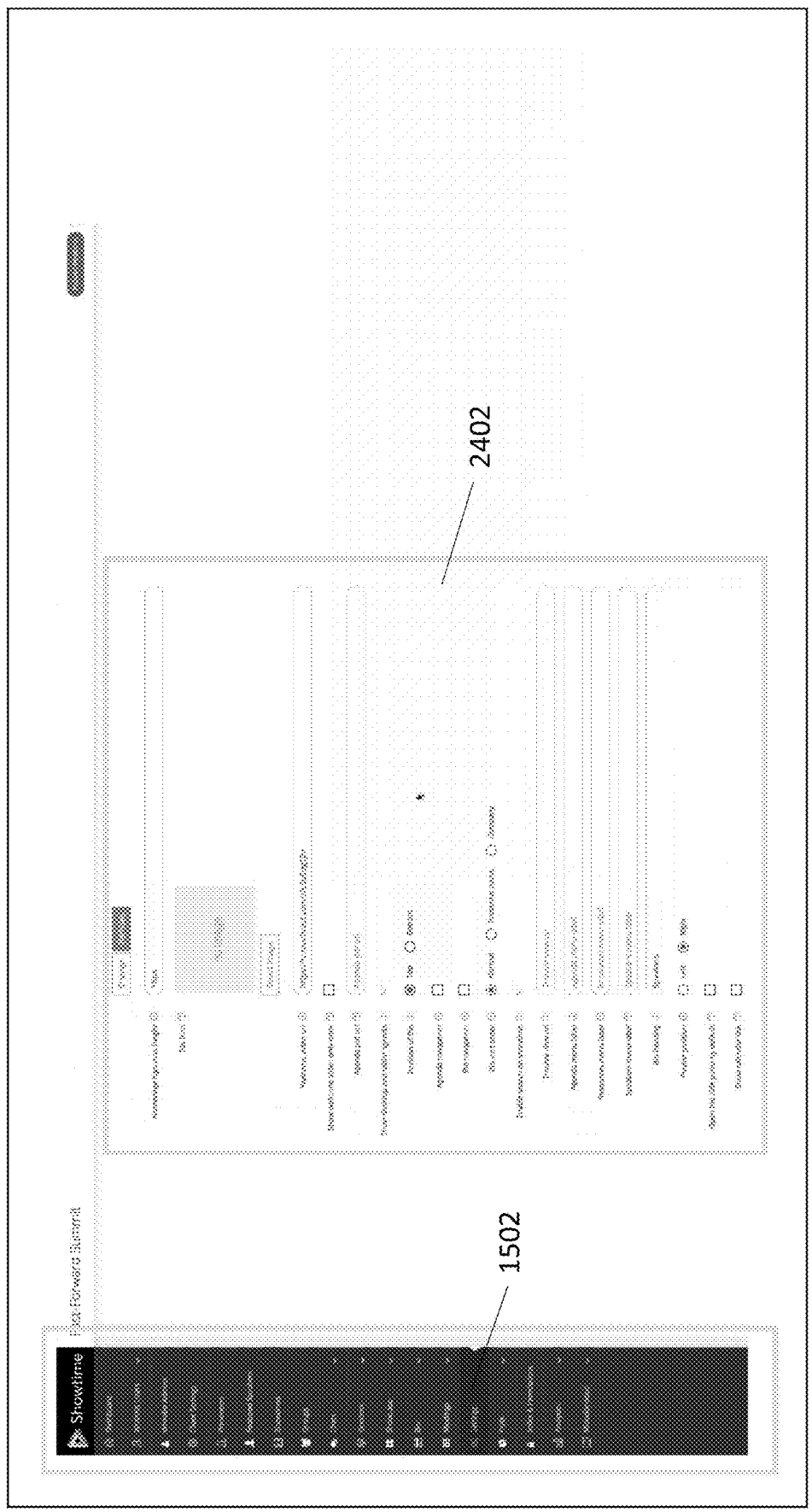
FIG. 24 illustrates an example graphic user interface display screen that includes continued options for event data management and presentation, in accordance with an example implementation.

FIG. 24 illustrates an example graphic user interface display screen that includes continued options for event data management and presentation, in accordance with an example implementation. Options include defining an image and dimensions for a logo, setting a welcome video uniform resource locator ("URL") and setting an option for the video to be shown only once or to loop. Moreover, as shown in FIG. 24, options are available for entering a URL for an agenda file, such as a PDF file, and for displaying a desktop and tablet agenda, positions for biographies, providing for agenda navigation, biography navigation, biography sort orders, and enabling searching. Further, options are available for defining a URL for users having trouble viewing, for defining agenda menu labels, resources menu labels, speakers menu labels, biography headings, playlist positions (e.g., left or right), opening side panels by default, and displaying calendar links.

Figure 25:
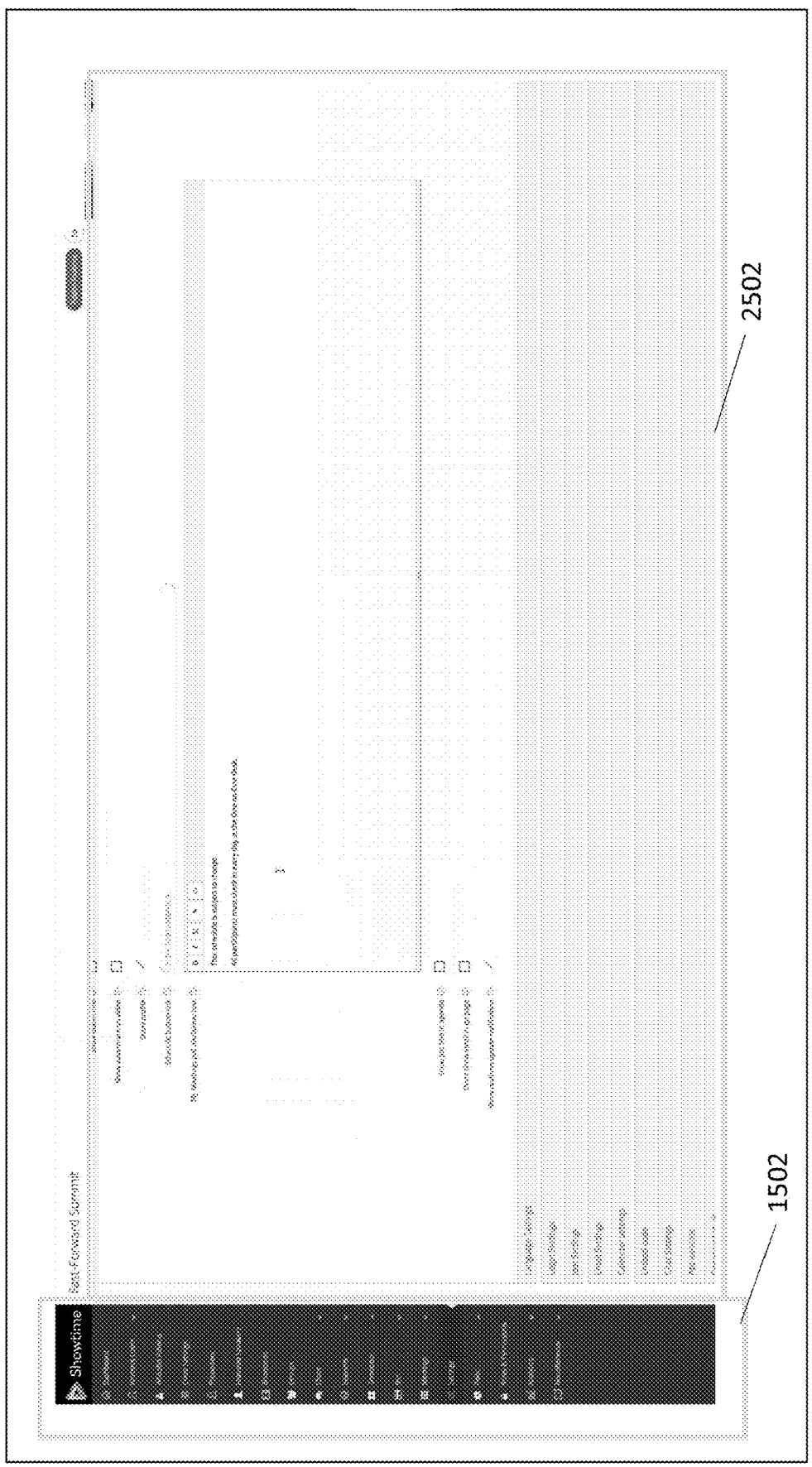
FIG. 25 illustrates an example graphic user interface display screen that includes continued options for event data management and presentation, in accordance with an example implementation.

FIG. 25 illustrates an example graphic user interface display screen that includes continued options for event data management and presentation, in accordance with an example implementation. Options include displaying a watermark on video, display a profile, providing a link for a graphical screen control (e.g., a button) for a schedule. Other options include a providing disclaimer text, include a job title in an agenda, prevent an email from being displayed in a questions and answers page, and providing real-time update notifications.

Figure 26:
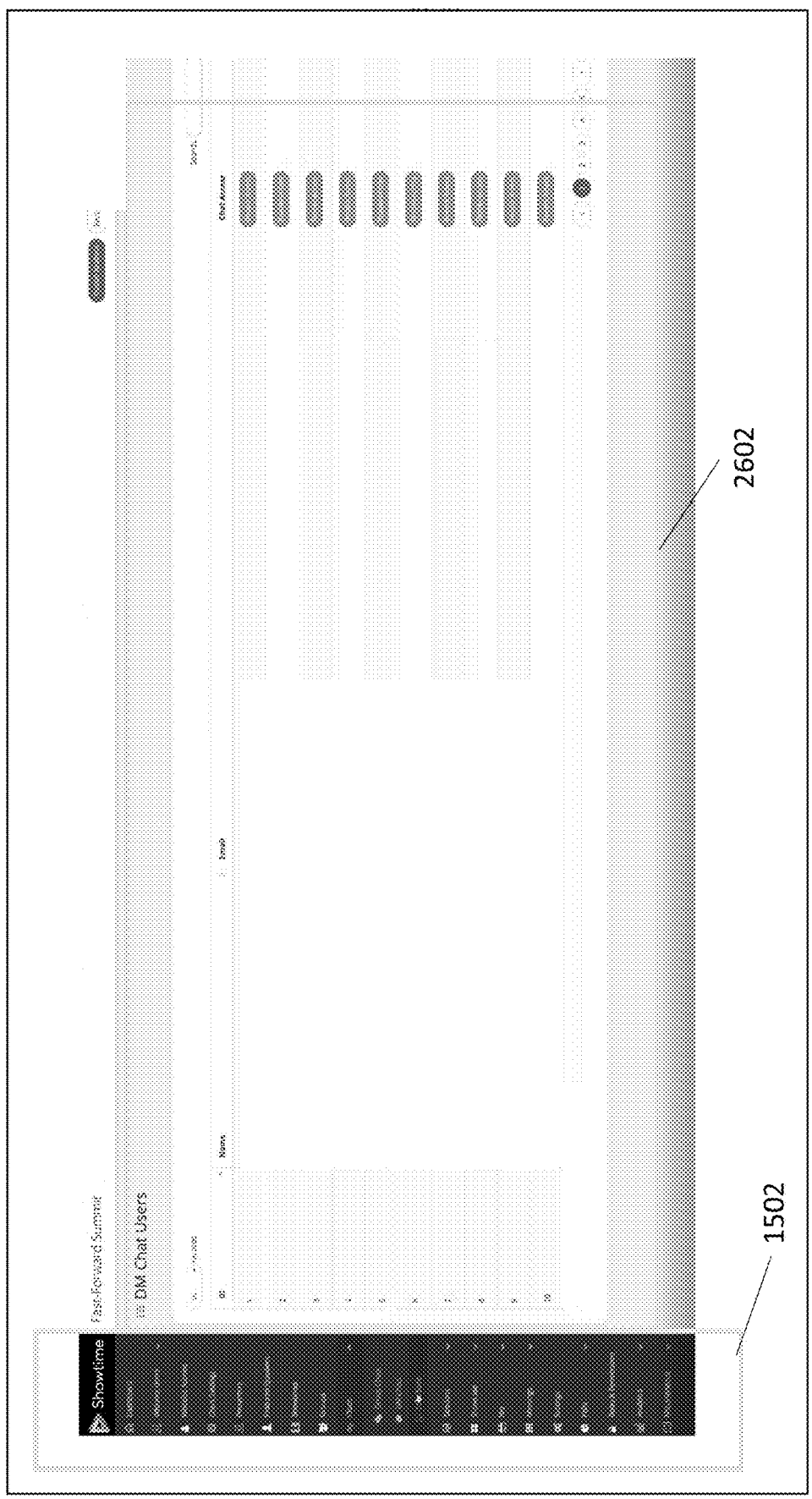
FIG. 26 shows an example graphic user interface display screen that identifies users during a respective event session that are provided with direct messaging (e.g., "chat") functionality.

Referring now to FIG. 26, an example graphic user interface display screen is provided that identifies users during a respective event session that are provided with direct messaging (e.g., "chat") functionality. The entries shown in FIG. 26 include user name, email address, and graphical screen control options (e.g., buttons) to revoke (or permit) chat access. The entries displayed in FIG. 26 can retrieved from one or more databases. Access rights provided via the graphic screen controls can be particularly useful in the event to prevent one or more users from engaging (or continuing to engage) in offensive or other language that may violate terms and conditions.

Figure 27:
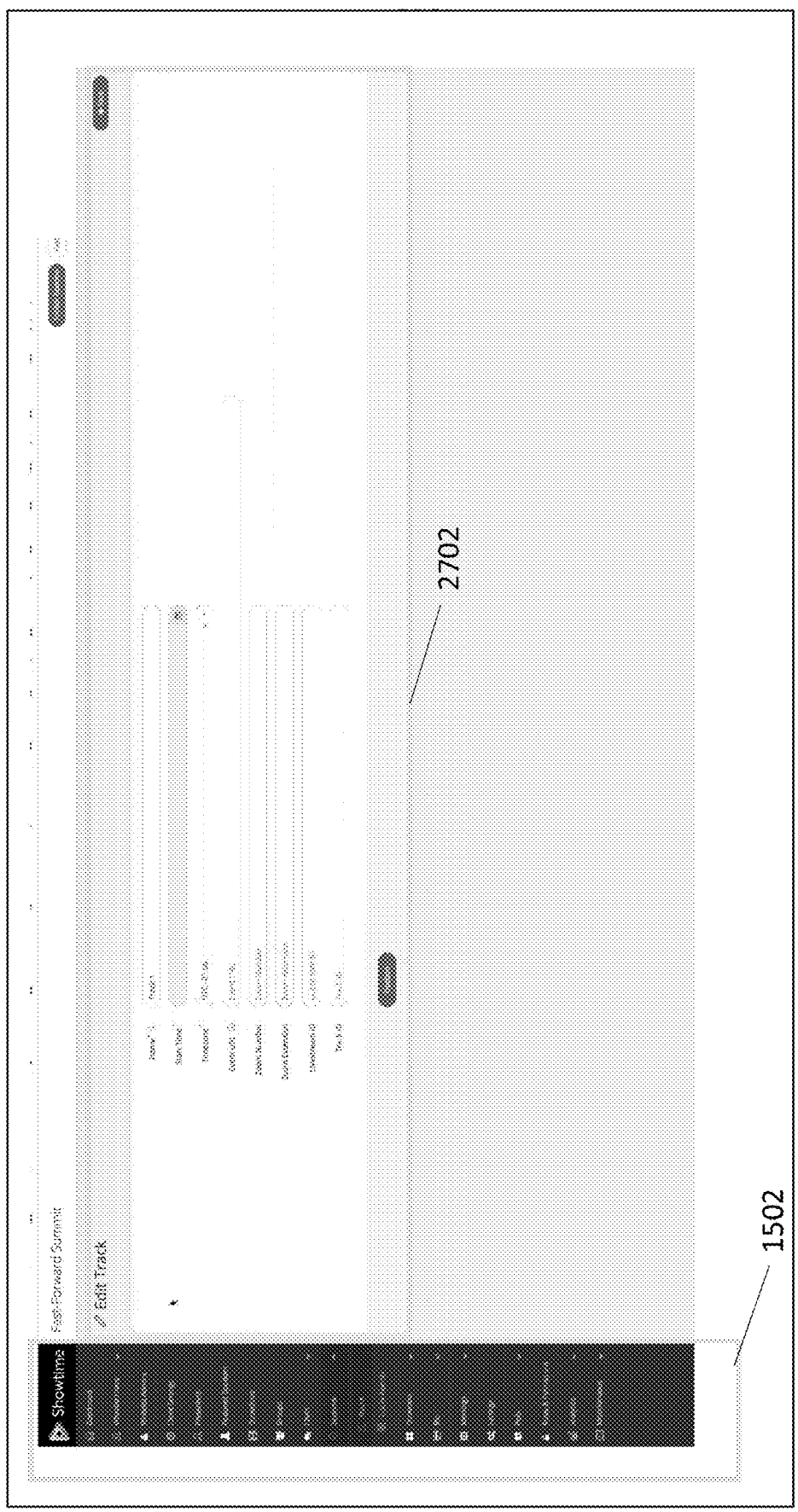
FIG. 27 illustrates an example graphic user interface display screen that includes options for editing scheduling, access, and other details associated with respective session tracks.
Figure 28:
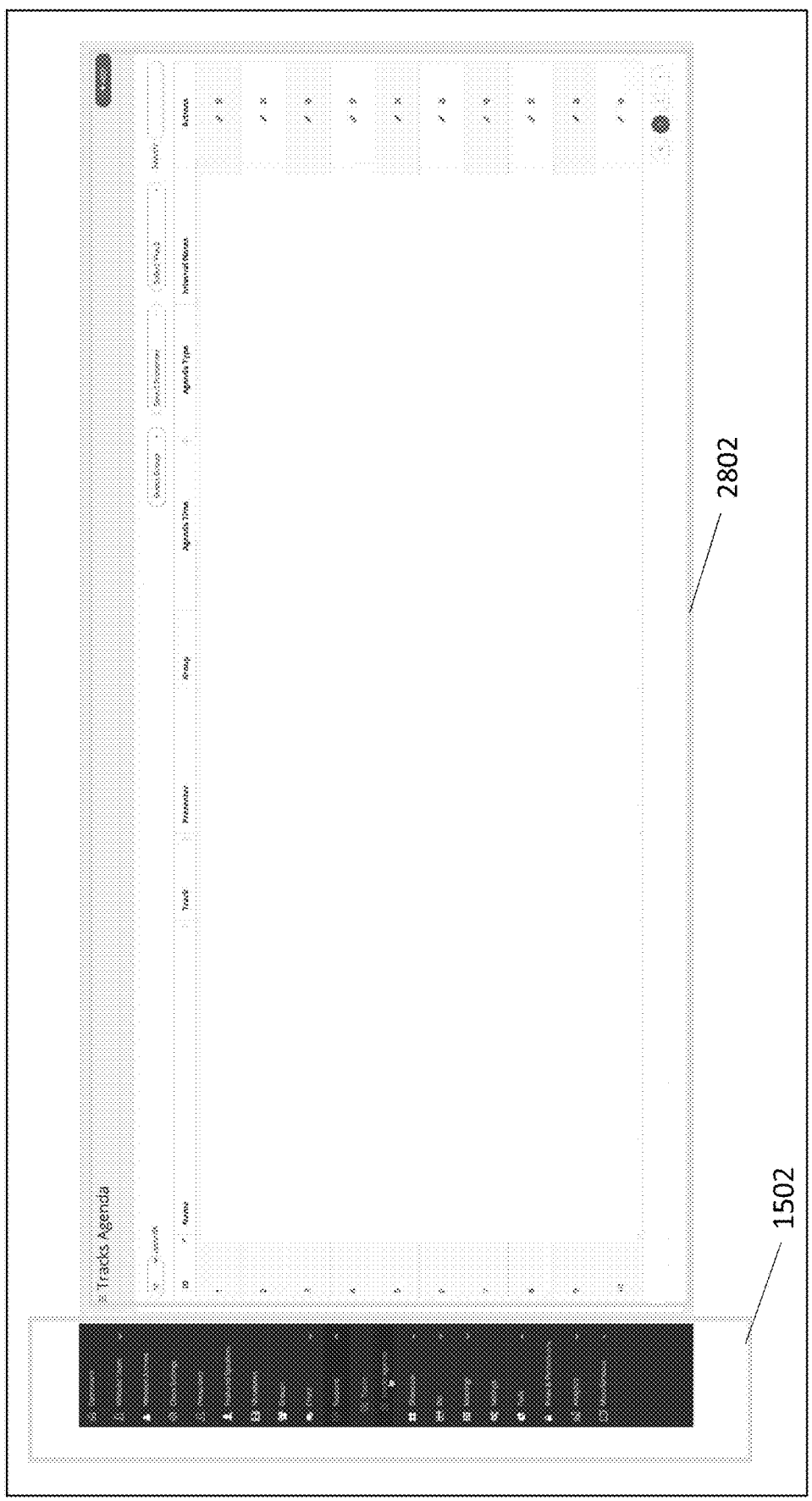
FIG. 28 illustrates an example graphic user interface display screen that includes options for editing agenda details associated with respective tracks.

FIG. 27 illustrates an example graphic user interface display screen that includes options for editing scheduling, access, and other details associated with respective session tracks. For example, and as illustrated in FIG. 27, options for adding, removing, or modifying track name, start time, time zone, event URL, ZOOM Number, ZOOM Extension, Livestream ID, and Track Id are provided. Using the options set forth in FIG. 27, users can adjust details associated with tracks. FIG. 28 illustrates an example graphic user interface display screen that includes options for editing agenda details associated with respective tracks. For example, details associated with agenda names, corresponding track numbers, presenters, groups, date/time, agenda type, and internal notes can be added, deleted, and/or modified.

Figure 29:
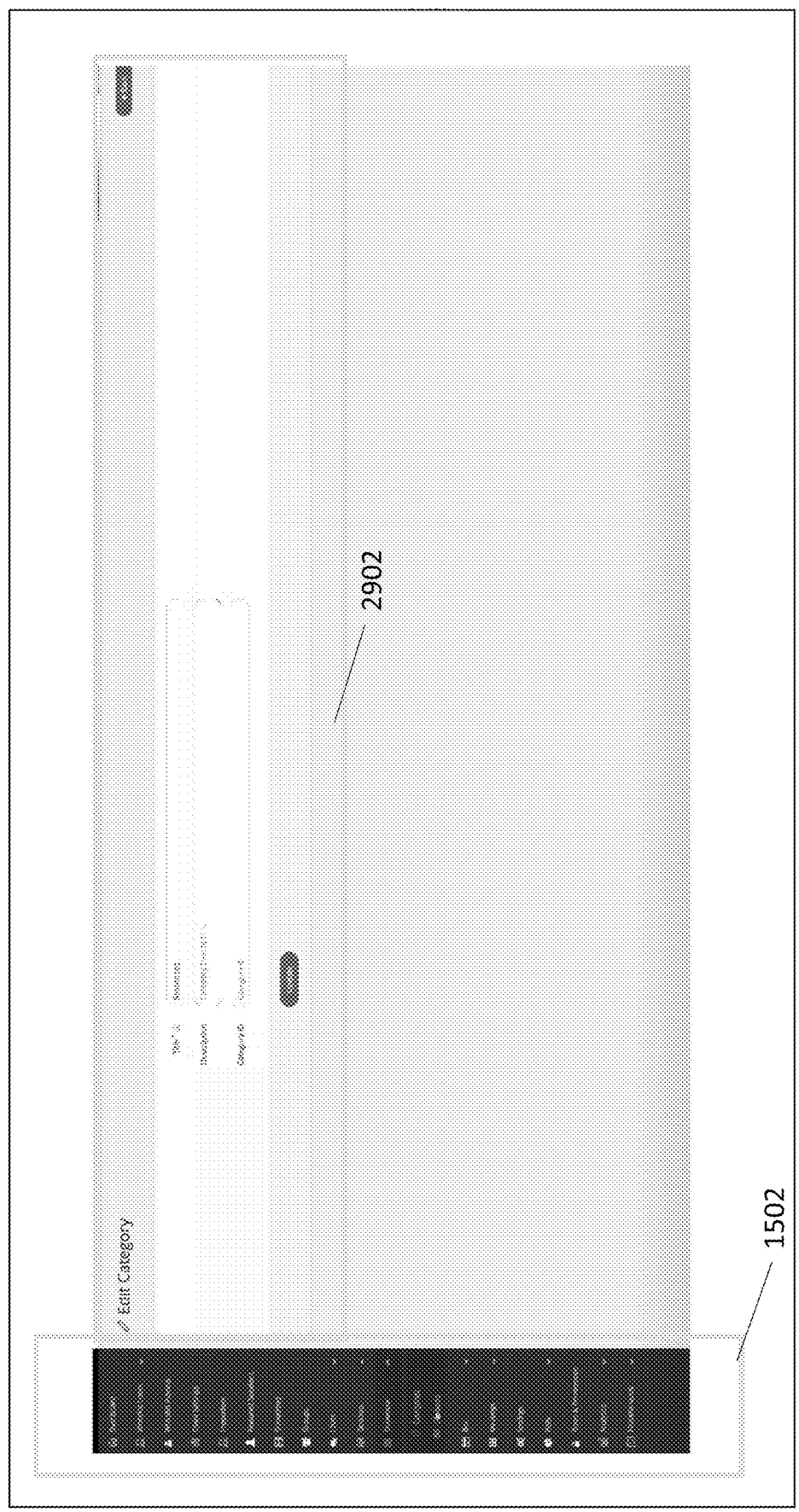
FIGS. 29 and 30 illustrate an example display screen for adding, deleting and modifying categories and contents for various materials that can be provided during a respective track.
Figure 30:
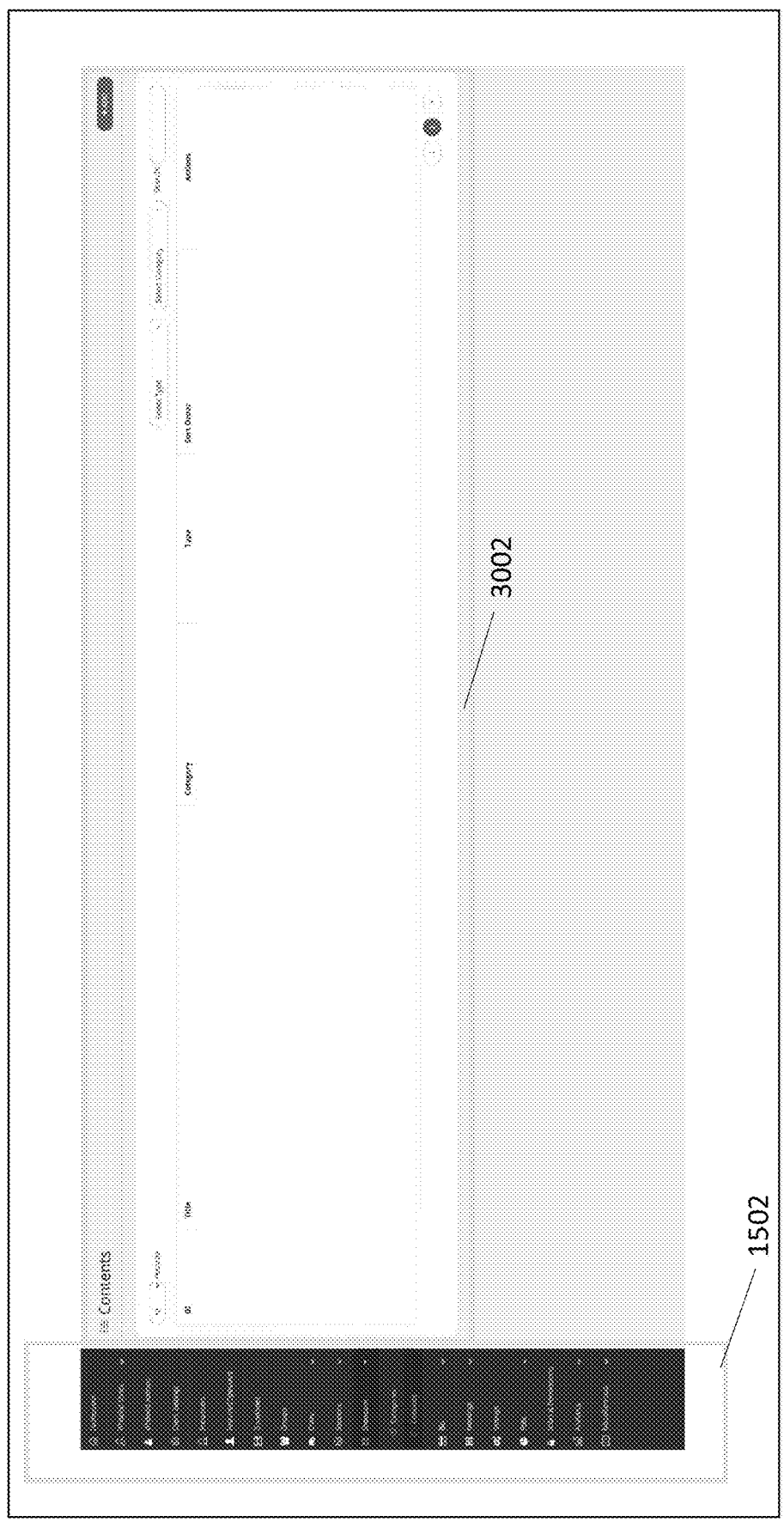

FIGS. 29 and 30 illustrate an example display screen for adding, deleting and modifying categories and contents for various materials that can be provided during a respective track. For example, and is shown in FIG. 29, a user can identify a respective category title and description that can be used to identify materials managed by one or more computing devices shown and described herein. The respective materials can include video, podcast, documents, links, or other types of content, and can be categorized, for example, for identification and sort purposes. Identifications of the materials can be provided via one or more graphical screen controls, such as drop-down lists, radio buttons, or the like for users to enable access to the materials for event prior participants.

Figure 31A:
FIGS. 31A-31F illustrate an implementation of the present disclosure and shows an example session, selected from a respective track.
Figure 31B:
Figure 31C:
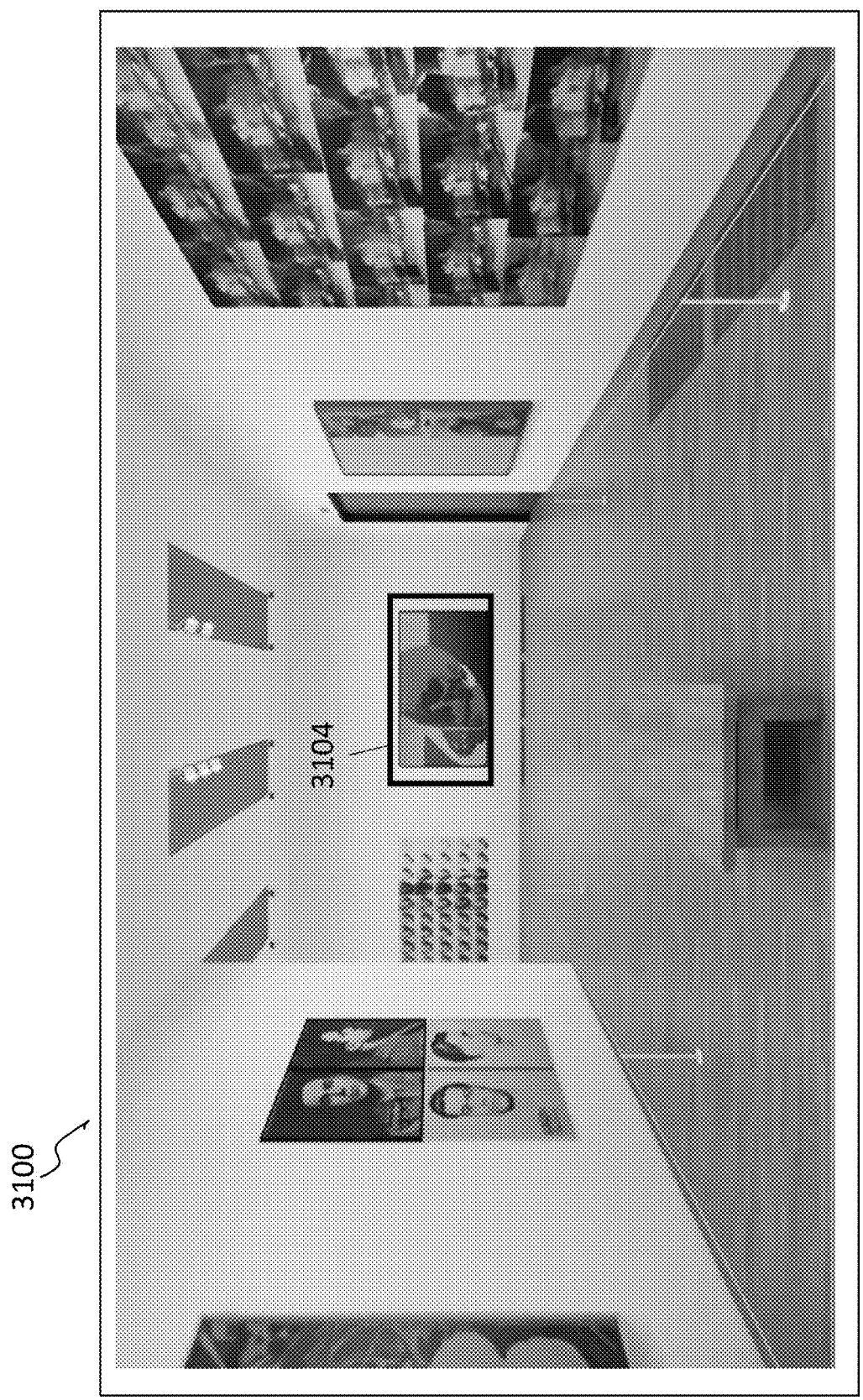
Figure 31D:
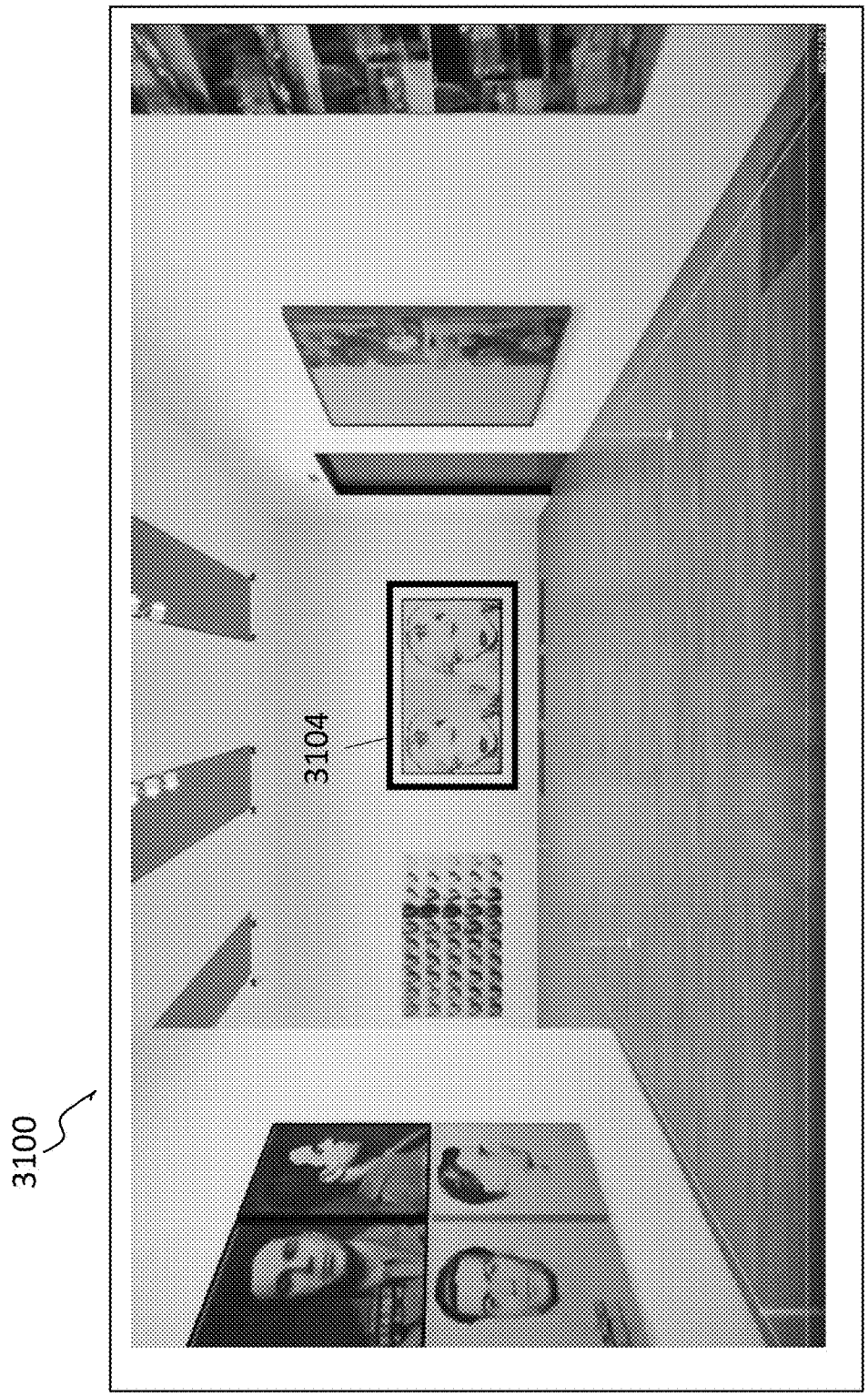
Figure 31E:
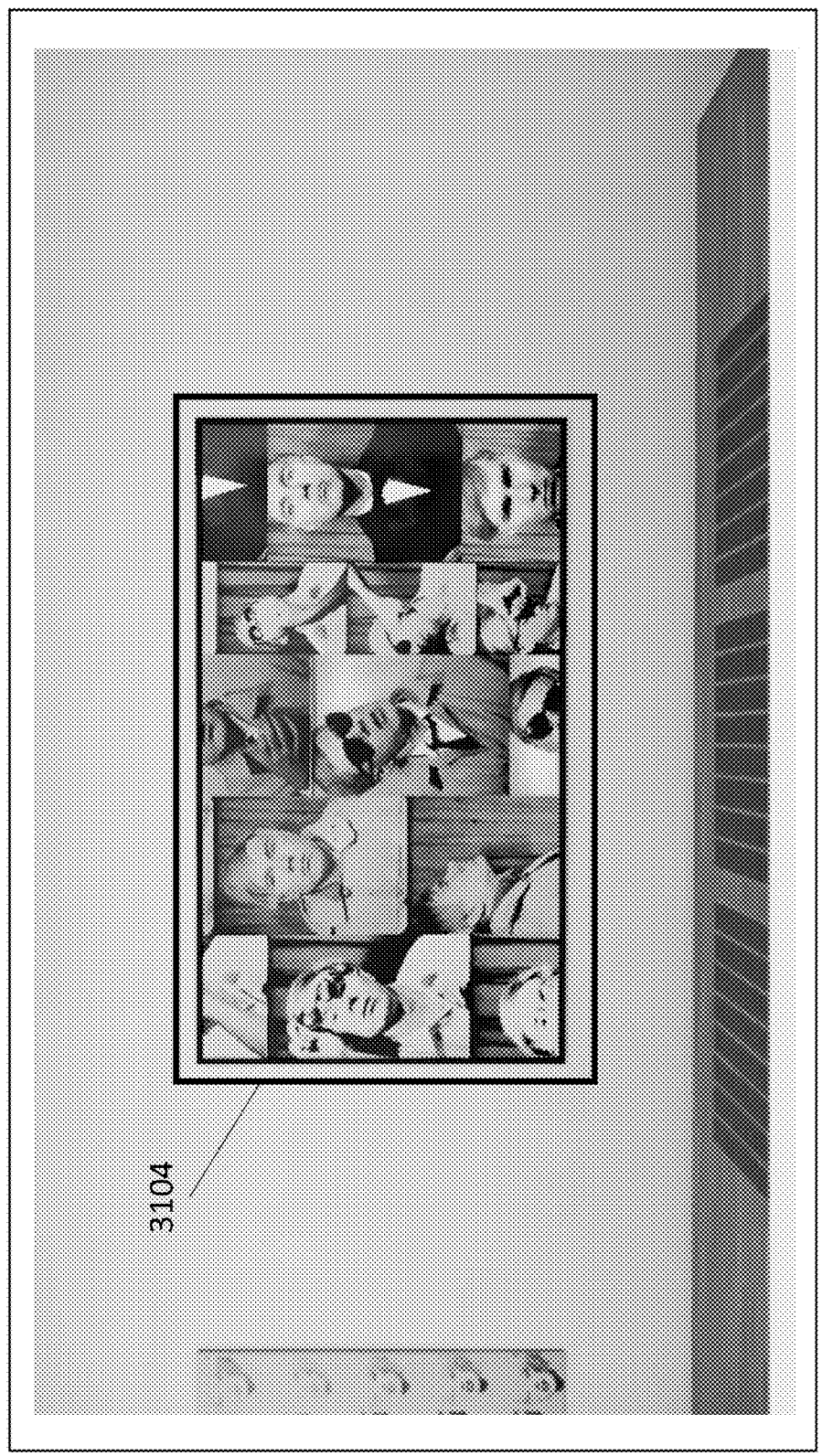
Figure 31F:

FIGS. 31A-31F illustrate an implementation of the present disclosure, including an example session, selected from a respective track ("Track 1) from "An Immersive Family Arts Experience" event. Upon selection of the session ("Virtual Tour of the Andy Warhol Exhibition"), a museum interior that includes the exhibition (FIG. 31B). FIGS. 31C-31F illustrate example display screens as user interacts with the. For example, FIG. 31C illustrates a hallway in the exhibit with works of Warhol appearing to hang on the walls. As can be seen in FIGS. 31C-31F, images that are displayed on the walls of the exhibit are dynamic and can change from one image to another, such as shown in image 3102.

Thus, as shown and described herein, the present disclosure provides a myriad of options for management, presentation, and access control to interactive online events and materials associated there with. The present disclosure provides an end-to-end solution for providing interactive virtual meeting events, and participants can attend and communicate together via controlled virtual environments, and can share information and materials via the systems and methods provided herein.

While operations shown and described herein may be in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a." "an" and "the" are intended to include the plural forms as well, unless the context clearly indicates otherwise. It will be further understood that the terms "comprises" and/or "comprising." when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented virtual event management platform, the platform comprising:
    non-transitory processor readable media;
    at least one processor operatively coupled to the non-transitory processor readable media, wherein the non-transitory processor readable media have instructions that, when executed by the at least one processor, causes the at least one processor to perform the following steps:
        define, for each of at least one date, a plurality of tracks, wherein each track comprises a plurality of respective virtual sessions;
        provide, to each of a plurality of computing devices, a graphical user interface that includes selectable options for each of the plurality of computing devices to select one or more tracks and one or more virtual sessions;
        define respective networked communication sessions, wherein the respective networked communication sessions are usable by each of the plurality of computing devices to join the one or more virtual sessions;
        receive, via the graphical user interface, responses to the selectable options, wherein each respective response enables access to at least one of the one or more virtual sessions, wherein some of the plurality of user computing devices are operated by users who are featured during a respective virtual session, and some of the plurality of user computing devices are operated by users who are not featured during a respective virtual session; and
        define access rights for respective ones of the plurality of computing devices operated by users who are not featured during a respective virtual session to communicate via a chat session during a respective virtual session.

2. The system of claim 1, wherein the non-transitory processor readable media have further instructions that, when executed by the at least one processor, causes the at least one processor to:
    receive, from each of the respective computing devices operated by users who are scheduled to attend a respective virtual session, contact information; and
    provide, as a function of the contact information, selectable options for the users who are scheduled to attend the respective virtual session to be introduced and communicate.

3. The system of claim 1, wherein the non-transitory processor readable media have further instructions that, when executed by the at least one processor, causes the at least one processor to:

manage meeting information representing each of a plurality of meetings for users who are scheduled to attend a respective virtual session to attend scheduled to attend a respective session receive, from at least one of the users; and provide, for each of the plurality of computing devices operated by users attending a respective session, at least some of the meeting information in selectable options.

4. The system of claim 3, wherein the meeting information includes at least a date and time for a meeting, a meeting identification, a passcode for joining the meeting, and a hyperlink that, when selected, provides access to the meeting.

5. The system of claim 4, wherein the non-transitory processor readable media have further instructions that, when executed by the at least one processor, causes the at least one processor to:

provide, a virtual meeting setting for users who join the meeting.

6. The system of claim 1, wherein the non-transitory processor readable media have further instructions that, when executed by the at least one processor, causes the at least one processor to:

generate and provide analytics associated with each of the respective virtual sessions.

7. A computer-implemented method for managing virtual events, the method comprising:

defining, by at least one processor configured by executing instructions stored on non-transitory processor readable media, for each of at least one date, a plurality of tracks, wherein each track comprises a plurality of respective virtual sessions;

providing, by the at least one processor, to each of a plurality of computing devices, a graphical user interface that includes selectable options for each of the plurality of computing devices to select one or more tracks and one or more virtual sessions;

defining, by the at least one processor, respective networked communication sessions, wherein the respective networked communication sessions are usable by each of the plurality of computing devices to join the one or more virtual sessions;

receiving, by the at least one processor via the graphical user interface, responses to the selectable options, wherein each respective response enables access to at least one of the one or more virtual sessions, wherein some of the plurality of user computing devices are operated by users who are featured during a respective virtual session, and some of the plurality of user computing devices are operated by users who are not featured during a respective virtual session; and defining, by the at least one processor, access rights for respective ones of the plurality of computing devices operated by users who are not featured during a respective virtual session to communicate via a chat session during a respective virtual session.

8. The method of claim 7, further comprising:

receiving, by the at least one processor, from each of the respective computing devices operated by users who are scheduled to attend a respective virtual session, contact information; and providing, by the at least one processor, as a function of the contact information, selectable options for the users who are scheduled to attend the respective virtual session to be introduced and communicate.

9. The method of claim 7, further comprising:

managing, by the at least one processor, meeting information representing each of a plurality of meetings for users who are scheduled to attend a respective virtual session to attend scheduled to attend a respective session receive, from at least one of the users provide, for each of the plurality of computing devices operated by users attending a respective session, at least some of the meeting information in selectable options.

10. The method of claim 9, wherein the meeting information includes at least a date and time for a meeting, a meeting identification, a passcode for joining the meeting, and a hyperlink that, when selected, provides access to the meeting.

11. The method of claim 10, further comprising:

providing, by the at least one processor, a virtual meeting setting for users who join the meeting.

12. The method of claim 7, further comprising:

generating and providing analytics associated with each of the respective virtual sessions.

* * * * *